US012260867B2

(12) United States Patent
Werner et al.

(10) Patent No.: US 12,260,867 B2
(45) Date of Patent: Mar. 25, 2025

(54) TIME-VARYING TIME-FREQUENCY TILINGS USING NON-UNIFORM ORTHOGONAL FILTERBANKS BASED ON MDCT ANALYSIS/SYNTHESIS AND TDAR

(71) Applicant: Fraunhofer-Gesellschaft zur Förderung der angewandten Forschung e.V., Munich (DE)

(72) Inventors: Nils Werner, Erlangen (DE); Bernd Edler, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 247 days.

(21) Appl. No.: 17/671,123

(22) Filed: Feb. 14, 2022

(65) Prior Publication Data

US 2022/0165283 A1 May 26, 2022

Related U.S. Application Data

(63) Continuation of application No. PCT/EP2020/073742, filed on Aug. 25, 2020.

(30) Foreign Application Priority Data

Aug. 28, 2019 (EP) .................................... 19194145

(51) Int. Cl.
*G10L 19/02* (2013.01)
*G10L 21/038* (2013.01)

(52) U.S. Cl.
CPC ...... *G10L 19/0204* (2013.01); *G10L 19/0212* (2013.01); *G10L 21/038* (2013.01)

(58) Field of Classification Search
CPC . G10L 19/00; G10L 19/0204; G10L 19/0212; G10L 21/00; G10L 21/038
See application file for complete search history.

(56) References Cited

U.S. PATENT DOCUMENTS

2005/0123150 A1 6/2005 Betts
2008/0269930 A1 10/2008 Yamashita et al.
(Continued)

FOREIGN PATENT DOCUMENTS

BR 122012021668 A2 7/2019
CN 109863555 A 6/2019
(Continued)

OTHER PUBLICATIONS

Bimbot, F. , et al., "Adaptive Filter Banks using Fixed Size MDCT and Subband Merging for Audio Coding—Comparison with the MPEG AAC Filter Banks", In Audio Engineering Society Convention 121. Oct. 2006, Audio Engineering Society.
(Continued)

*Primary Examiner* — Daniel C Washburn
*Assistant Examiner* — Sean E Serraguard
(74) *Attorney, Agent, or Firm* — Perkins Coie LLP; Michael A. Glenn

(57) ABSTRACT

Embodiments provide a method for processing an audio signal, including: performing a cascaded lapped critically sampled transform on two partially overlapping blocks of samples of the audio signal, to obtain sets of subband samples; identifying one or more sets of subband samples that in combination represent the same region of the time-frequency plane; performing time-frequency transforms on the identified one or more sets of subband samples, to obtain one or more time-frequency transformed subband samples, each of which represents the same region in the time-frequency plane; performing a weighted combination of two corresponding sets of subband samples or time-frequency transformed versions thereof, to obtain aliasing reduced subband representations of the audio signal.

18 Claims, 21 Drawing Sheets

(56) References Cited

U.S. PATENT DOCUMENTS

| | | | | |
|---|---|---|---|---|
| 2009/0319283 | A1* | 12/2009 | Schnell | H03H 17/0266 704/E21.001 |
| 2010/0119085 | A1 | 5/2010 | Shimizu et al. | |
| 2011/0137643 | A1* | 6/2011 | Yamanashi | G10L 19/24 704/E19.01 |
| 2013/0314599 | A1 | 11/2013 | Kikugawa | |
| 2015/0279383 | A1* | 10/2015 | Crockett | G10L 19/0204 704/500 |
| 2017/0069328 | A1* | 3/2017 | Kawashima | G10L 19/002 |
| 2019/0108849 | A1 | 4/2019 | Disch et al. | |
| 2019/0172471 | A1 | 6/2019 | Werner et al. | |
| 2021/0233544 | A1 | 7/2021 | Werner et al. | |

FOREIGN PATENT DOCUMENTS

| | | | | |
|---|---|---|---|---|
| EP | 3276620 | A1 * | 1/2018 | G06F 17/14 |
| EP | 3644313 | A1 | 4/2020 | |
| JP | 2019526074 | A | 9/2019 | |
| JP | 2022505789 | A | 1/2022 | |
| RU | 2676416 | C2 | 12/2018 | |
| WO | 2010114123 | A1 | 10/2010 | |
| WO | 2018019909 | A1 | 2/2018 | |
| WO | 2018201112 | A1 | 11/2018 | |

OTHER PUBLICATIONS

Edler, B. , "Codierung von Audiosignalen mit überlappender Transformation und adaptiven Fensterfunktionen", Frequenz, vol. 43, pp. 252-256, Sep. 1989.

Guo, Ning , "Optimization of a Time-Varying Non-Uniform Filter Bank for Audio Coding" 2018.

Malvar, H.S. , "Biorthogonal and nonuniform lapped transforms for transform coding with reduced blocking and ringing artifacts", IEEE Transactions on Signal Processing, vol. 46, No. 4, pp. 1043-1053, Apr. 1998.

Niamut, O.A. , et al., "Subband merging in cosine-modulated filter banks", IEEE Signal Processing Letters, vol. 10, No. 4, pp. 111-114, Apr. 2003.

Princen, John , et al., "Analysis/Synthesis Filter Bank Design Based on Time Domain Aliasing Cancellation; IEEE Transactions on Acoustics, Speech and Signal Processing", IEEE Inc. New York. USA, vol. ASSP-34. No. 5, Oct. 1, 1986 (1986-18-81). pp. 1153-1161, XP000674042.

Princen, John P., et al., "Subband/Transform Coding Using Filger bank Designs Based on Time Domain Aliasing Cancellation", International Conference on Acoustics, Speech & Signal Processing. ICASSP; Dallas, Apr. 6-9, 1987; 19870406 New York, IEEE, US; CPC: Source information: vol. 4, pp. 2161-2164; Publication info: XP000560572.

Schuh, F. , et al., "Efficient Multichannel Audio Transform Coding with Low Delay and Complexity", Audio Engineering Society, Sep. 2016, 10 pages.

Schuller, G.D.T. , et al., "New framework for modulated perfect reconstruction filter banks", IEEE Transactions on Signal Processing, vol. 44, No. 8, pp. 1941-1954, Aug. 1996.

Schuller, Gerald , "Time-Varying Filter Banks With Variable System Delay", In IEEE International Conference on Acoustics, Speech, and Signal Processing, ICASSP, 1997, pp. 21-24.

Taswell, Carl , "Empirical Tests for Evaluation of Multirate Filter Bank Parameters", In Wavelets in Signal and Image Analysis, Max A. Viergever, Arthur A. Petrosian, and François G. Meyer, Eds., vol. 19, pp. 111-139. Springer Netherlands, Dordrecht, 2001.

Werner, Nils , et al., "Experimenting with Lapped Transforms in Numerical Computation Libmries Using Polyphase Matrices and Strided Memory Views", In Audio Engineering Society Convention 146, Mar. 2019.

Werner, N. , et al., "Nonuniform Orthogonal Filterbanks Based on MDCT Analysis/Synthesis and Time-Domain Aliasing Reduction", IEEE Signal Processing Letters, vol. 24, No. 5, pp. 589-593, May 2017.

Werner, Nils , et al., "Perceptual Audio Coding with Adaptive Non-Uniform Time/frequency Tilings using Subband Merging and Time Domain Aliasing Reduction", In 2019 IEEE International Conference on Acoustics, Speech and Signal Processing, 2019.

Werner, N. , et al., "Time-Varying Time-Frequency Tilings Using Non-Uniform Orthogonal Filter banks Based on MDCT Analysis/Synthesis and TDAR", To appear in IEEE Signal Processing Letters, Sep. 2019, 5 pages.

* cited by examiner

TIME-VARYING TIME-FREQUENCY TILINGS USING NON-UNIFORM ORTHOGONAL FILTERBANKS BASED ON MDCT ANALYSIS/SYNTHESIS AND TDAR

CROSS-REFERENCES TO RELATED APPLICATIONS

This application is a continuation of copending International Application No. PCT/EP2020/073742, filed Aug. 25, 2020, which is incorporated herein by reference in its entirety, and additionally claims priority from European Application No 19194145.9, filed Aug. 28, 2019, which is incorporated herein by reference in its entirety.

BACKGROUND OF THE INVENTION

Embodiments relate to an audio processor/method for processing an audio signal to obtain a subband representation of the audio signal. Further embodiments relate to an audio processor/method for processing a subband representation of an audio signal to obtain the audio signal. Some embodiments relate to time-varying time-frequency tilings using non-uniform orthogonal filterbanks based on MDCT (MDCT=modified discrete cosine transform) analysis/synthesis and TDAR (TDAR=time-domain aliasing reduction).

It was previously shown that the design of a nonuniform orthogonal filterbank using subband merging is possible [1], [2], [3] and, introducing a postprocessing step named Time Domain Aliasing Reduction (TDAR), compact impulse responses are possible [4]. Also, the use of this TDAR filterbank in audio coding was shown to yield a higher coding efficiency and/or improved perceptual quality over window switching [5].

However, one major disadvantage of TDAR is the fact that it needs two adjacent frames to use identical time-frequency tilings. This limits the flexibility of the filterbank when time-varying adaptive time-frequency tilings are needed, as TDAR has to be temporarily disabled to switch from one tiling to another. Such a switch is commonly needed when the input signal characteristics change, i.e. when transients are encountered. In uniform MDCT, this is achieved using window switching [6].

SUMMARY

An embodiment may have an audio processor for processing an audio signal to acquire a subband representation of the audio signal, the audio processor comprising: a cascaded lapped critically sampled transform stage configured to perform a cascaded lapped critically sampled transform on at least two partially overlapping blocks of samples of the audio signal, to acquire sets of subband samples on the basis of a first block of samples of the audio signal, and to acquire sets of subband samples on the basis of a second block of samples of the audio signal; a first time-frequency transform stage configured to identify, in case that the sets of subband samples that are based on the first block of samples represent different regions in a time-frequency plane compared to the sets of subband samples that are based on the second block of samples, one or more sets of subband samples out of the sets of subband samples that are based on the first block of samples and one or more sets of subband samples out of the sets of subband samples that are based on the second block of samples that in combination represent the same region in the time-frequency plane, and to time-frequency transform the identified one or more sets of subband samples out of the sets of subband samples that are based on the first block of samples and/or the identified one or more sets of subband samples out of the sets of subband samples that are based on the second block of samples, to acquire one or more time-frequency transformed subband samples, each of which represents the same region in the time-frequency plane than a corresponding one of the identified one or more subband samples or one or more time-frequency transformed versions thereof; and a time domain aliasing reduction stage configured to perform a weighted combination of two corresponding sets of subband samples or time-frequency transformed versions thereof, one acquired on the basis of the first block of samples of the audio signal and one acquired on the basis on the second block of samples of the audio signal, to acquire aliasing reduced subband representations of the audio signal.

Another embodiment may have an audio processor for processing a subband representation of an audio signal to acquire the audio signal, the subband representation of the audio signal comprising sets of aliasing reduced subband samples, the audio processor comprising: a second inverse time-frequency transform stage configured to time-frequency transform one or more sets of aliasing reduced subband samples out of sets of aliasing reduced subband samples corresponding to a first block of samples of the audio signal and/or one or more sets of aliasing reduced subband samples out of sets of aliasing reduced subband samples corresponding to a second block of samples of the audio signal, to acquire one or more time-frequency transformed aliasing reduced subband samples, each of which represents the same region in the time-frequency plane than a corresponding one of the one or more aliasing reduced subband samples corresponding to the other block of samples of the first block of samples and the second block of samples of the audio signal or one or more time-frequency transformed versions thereof, an inverse time domain aliasing reduction stage configured to perform weighted combinations of corresponding sets of aliasing reduced subband samples or time-frequency transformed versions thereof, to acquire an aliased subband representation, a first inverse time-frequency transform stage configured to time-frequency transform the aliased subband representation, to acquire sets of subband samples corresponding to the first block of samples of the audio signal and sets of subband samples corresponding to the second block of samples of the audio signal, wherein a time-frequency transform applied by the first inverse time-frequency transform stage is inverse to the time-frequency transform applied by the second inverse time-frequency transform stage, a cascaded inverse lapped critically sampled transform stage configured to perform a cascaded inverse lapped critically sampled transform on the sets of samples, to acquire a set of samples associated with a block of samples of the audio signal.

Another embodiment may have a method for processing an audio signal to acquire a subband representation of the audio signal, the method comprising: performing a cascaded lapped critically sampled transform on at least two partially overlapping blocks of samples of the audio signal, to acquire sets of subband samples on the basis of a first block of samples of the audio signal, and to acquire sets of subband samples on the basis of a second block of samples of the audio signal; identifying, in case that the sets of subband samples that are based on the first block of samples represent different regions in a time-frequency plane compared to the sets of subband samples that are based on the second block of samples, one or more sets of subband samples out of the sets of subband samples that are based on the first block of samples and one or more sets of subband samples out of the sets of subband samples that are based on the second block of samples that in combination represent the same region of the time-frequency plane, performing time-frequency transforms on the identified one or more sets of subband samples out of the sets of subband samples that are based on the first block of samples and/or the identified one or more sets of subband samples out of the sets of subband samples that are based on the second block of samples, to acquire one or more time-frequency transformed subband samples, each of which represents the same region in the time-frequency plane than a corresponding one of the identified one or more subband samples or one or more time-frequency transformed versions thereof; and performing a weighted combination of two corresponding sets of subband samples or time-frequency transformed versions thereof, one acquired on the basis of the first block of samples of the audio signal and one acquired on the basis on the second block of samples of the audio signal, to acquire aliasing reduced subband representations of the audio signal.

Another embodiment may have a method for processing a subband representation of an audio signal to acquire the audio signal, the subband representation of the audio signal comprising sets of aliasing reduced subband samples, the method comprising: performing a time-frequency transforms on one or more sets of aliasing reduced subband samples out of sets of aliasing reduced subband samples corresponding to a first block of samples of the audio signal and/or one or more sets of aliasing reduced subband samples out of sets of aliasing reduced subband samples corresponding to a second block of samples of the audio signal, to acquire one or more time-frequency transformed aliasing reduced subband samples, each of which represents the same region in the time-frequency plane than a corresponding one of the one or more aliasing reduced subband samples corresponding to the other block of samples of the first block of samples and the second block of samples of the audio signal or one or more time-frequency transformed versions thereof, performing weighted combinations of corresponding sets of aliasing reduced subband samples or time-frequency transformed versions thereof, to acquire an aliased subband representation, performing time-frequency transforms on the aliased subband representation, to acquire sets of subband samples corresponding to the first block of samples of the audio signal and sets of subband samples corresponding to the second block of samples of the audio signal, wherein time-frequency transforms performed on the one or more sets of aliasing reduced subband samples out of sets of aliasing reduced subband samples corresponding to the first block of samples of the audio signal or the one or more sets of aliasing reduced subband samples out of sets of aliasing reduced subband samples corresponding to the second block of samples of the audio signal are inverse to the time-frequency transforms performed on the aliased subband representation, performing a cascaded inverse lapped critically sampled transform on the sets of samples, to acquire a set of samples associated with a block of samples of the audio signal.

Another embodiment may have a non-transitory digital storage medium having a computer program stored thereon to perform the method for processing an audio signal to acquire a subband representation of the audio signal, the method comprising: performing a cascaded lapped critically sampled transform on at least two partially overlapping blocks of samples of the audio signal, to acquire sets of subband samples on the basis of a first block of samples of the audio signal, and to acquire sets of subband samples on the basis of a second block of samples of the audio signal; identifying, in case that the sets of subband samples that are based on the first block of samples represent different regions in a time-frequency plane compared to the sets of subband samples that are based on the second block of samples, one or more sets of subband samples out of the sets of subband samples that are based on the first block of samples and one or more sets of subband samples out of the sets of subband samples that are based on the second block of samples that in combination represent the same region of the time-frequency plane, performing time-frequency transforms on the identified one or more sets of subband samples out of the sets of subband samples that are based on the first block of samples and/or the identified one or more sets of subband samples out of the sets of subband samples that are based on the second block of samples, to acquire one or more time-frequency transformed subband samples, each of which represents the same region in the time-frequency plane than a corresponding one of the identified one or more subband samples or one or more time-frequency transformed versions thereof; and performing a weighted combination of two corresponding sets of subband samples or time-frequency transformed versions thereof, one acquired on the basis of the first block of samples of the audio signal and one acquired on the basis on the second block of samples of the audio signal, to acquire aliasing reduced subband representations of the audio signal, when said computer program is run by a computer.

Another embodiment may have a non-transitory digital storage medium having a computer program stored thereon to perform the method for processing a subband representation of an audio signal to acquire the audio signal, the subband representation of the audio signal comprising sets of aliasing reduced subband samples, the method comprising: performing a time-frequency transforms on one or more sets of aliasing reduced subband samples out of sets of aliasing reduced subband samples corresponding to a first block of samples of the audio signal and/or one or more sets of aliasing reduced subband samples out of sets of aliasing reduced subband samples corresponding to a second block of samples of the audio signal, to acquire one or more time-frequency transformed aliasing reduced subband samples, each of which represents the same region in the time-frequency plane than a corresponding one of the one or more aliasing reduced subband samples corresponding to the other block of samples of the first block of samples and the second block of samples of the audio signal or one or more time-frequency transformed versions thereof, performing weighted combinations of corresponding sets of aliasing reduced subband samples or time-frequency transformed versions thereof, to acquire an aliased subband representation, performing time-frequency transforms on the aliased subband representation, to acquire sets of subband samples corresponding to the first block of samples of the audio signal and sets of subband samples corresponding to the second block of samples of the audio signal, wherein time-frequency transforms performed on the one or more sets of aliasing reduced subband samples out of sets of aliasing reduced subband samples corresponding to the first block of samples of the audio signal or the one or more sets of aliasing reduced subband samples out of sets of aliasing reduced subband samples corresponding to the second block of samples of the audio signal are inverse to the time-frequency transforms performed on the aliased subband representation, performing a cascaded inverse lapped critically sampled transform on the sets of samples, to acquire a set of samples associated with a block of samples of the audio signal, when said computer program is run by a computer.

Embodiments provide an audio processor for processing an audio signal to obtain a subband representation of the audio signal. The audio processor comprises a cascaded lapped critically sampled transform stage configured to perform a cascaded lapped critically sampled transform on at least two partially overlapping blocks of samples of the audio signal, to obtain sets of subband samples on the basis of a first block of samples of the audio signal, and to obtain sets of subband samples on the basis of a second block of samples of the audio signal. Further, the audio processor comprises a first time-frequency transform stage configured to identify, in case that the sets of subband samples that are based on the first block of samples represent different regions in a time-frequency plane [e.g. time-frequency plane representation of the first block of samples and the second block of samples] compared to the sets of subband samples that are based on the second block of samples, one or more sets of subband samples out of the sets of subband samples that are based on the first block of samples and one or more sets of subband samples out of the sets of subband samples that are based on the second block of samples that in combination represent the same region in the time-frequency plane, and to time-frequency transform the identified one or more sets of subband samples out of the sets of subband samples that are based on the first block of samples and/or the identified one or more sets of subband samples out of the sets of subband samples that are based on the second block of samples, to obtain one or more time-frequency transformed subband samples, each of which represents the same region in the time-frequency plane than a corresponding one of the identified one or more subband samples or one or more time-frequency transformed versions thereof. Further, the audio processor comprises a time domain aliasing reduction stage configured to perform a weighted combination of two corresponding sets of subband samples or time-frequency transformed versions thereof, one obtained on the basis of the first block of samples of the audio signal and one obtained on the basis on the second block of samples of the audio signal, to obtain aliasing reduced subband representations of the audio signal (102).

In embodiments, the time-frequency transform performed by the time-frequency transform stage is a lapped critically sampled transform.

In embodiments, the time-frequency transform of the identified one or more sets of subband samples out of the sets of subband samples that are based on the second block of samples and/or of the identified one or more sets of subband samples out of the sets of subband samples that are based on the second block of samples performed by the time-frequency transform stage corresponds to a transform described by the following formula $$S(m) = \begin{bmatrix} T_0 & & \\ & \ddots & \\ & & T_K \end{bmatrix} (m)$$

wherein S(m) describes the transform, wherein m describes the index of the block of samples of the audio signal, wherein $T_0 \ldots T_K$ describe the subband samples of the corresponding identified one or more sets of subband samples.

For example, the time-frequency transform stage can be configured to time-frequency transform the identified one or more sets of subband samples out of the sets of subband samples that are based on the second block of samples and/or of the identified one or more sets of subband samples out of the sets of subband samples that are based on the second block of samples based on the above formula.

In embodiments, the cascaded lapped critically sampled transform stage is configured to process a first set of bins obtained on the basis of the first block of samples of the audio signal and a second set of bins obtained on the basis of the second block of samples of the audio signal using a second lapped critically sampled transform stage of the cascaded lapped critically sampled transform stage, wherein the second lapped critically sampled transform stage is configured to perform, in dependence on signal characteristics of the audio signal [e.g., when signal characteristics of the audio signal change], first lapped critically sampled transforms on the first set of bins and second lapped critically sampled transforms on the second set of bins, one or more of the first critically sampled transforms having different lengths when compared to the second critically sampled transforms.

In embodiments, the time-frequency transform stage is configured to identify, in case that one or more of the first critically sampled transforms have different lengths [e.g., mergefactors] when compared to the second critically sampled transforms, one or more sets of subband samples out of the sets of subband samples that are based on the first block of samples and one or more sets of subband samples out of the sets of subband samples that are based on the second block of samples that represent the same time-frequency portion of the audio signal.

In embodiments, the audio processor comprises a second time-frequency transform stage configured to time frequency-transform the aliasing reduced subband representation of the audio signal, wherein a time-frequency transform applied by the second time-frequency transform stage is inverse to the time-frequency transform applied by the first time-frequency transform stage.

In embodiments, the time-domain aliasing reduction performed by the time-domain aliasing reduction stage corresponds to a transform described by the following formula $$R(z, m) = \begin{bmatrix} F'_0 & & \\ & \ddots & \\ & & F'_K \end{bmatrix}^{-1} (z, m)$$

wherein R(z,m) describes the transform, wherein z describes a frame-index in z-domain, wherein m describes the index of the block of samples of the audio signal, wherein $F'_0 \ldots F'_K$ describe modified versions of N×N lapped critically sampled transform pre-permutation/folding matrices.

In embodiments, the audio processor is configured to provide a bitstream comprising a STDAR parameter indicating whether a length of the identified one or more sets of subband samples corresponding to the first block of samples or to the second block of samples is used in the time-domain aliasing reduction stage for obtaining the corresponding aliasing reduced subband representation of the audio signal, or wherein the audio processor is configured to provide a bitstream comprising MDCT length parameters [e.g., mergefactor [MF] parameters] indicating lengths of the sets of subband samples.

In embodiments, the audio processor is configured to perform joint channel coding.

In embodiments, the audio processor is configured to perform M/S or MCT as joint channel processing.

In embodiments, the audio processor is configured to provide a bitstream comprising at least one STDAR parameter indicating a length of the one or more time-frequency transformed subband samples corresponding to the first block of samples and of the one or more time-frequency transformed subband samples corresponding to the second block of samples used in the time-domain aliasing reduction stage for obtaining the corresponding aliasing reduced subband representation of the audio signal or an encoded version thereof [e.g., entropy or differentially encoded version thereof].

In embodiments, the cascaded lapped critically sampled transform stage comprises a first lapped critically sampled transform stage configured to perform lapped critically sampled transforms on a first block of samples and a second block of samples of the at least two partially overlapping blocks of samples of the audio signal, to obtain a first set of bins for the first block of samples and a second set of bins for the second block of samples.

In embodiments, the cascaded lapped critically sampled transform stage further comprises a second lapped critically sampled transform stage configured to perform a lapped critically sampled transform on a segment of the first set of bins and to perform a lapped critically sampled transform on a segment of the second set of bins, each segment being associated with a subband of the audio signal, to obtain a set of subband samples for the first set of bins and a set of subband samples for the second set of bins.

Further embodiments provide an audio processor for processing a subband representation of an audio signal to obtain the audio signal, the subband representation of the audio signal comprising aliasing reduced sets of samples. The audio processor comprises a second inverse time-frequency transform stage configured to time-frequency transform one or more sets of aliasing reduced subband samples out of sets of aliasing reduced subband samples corresponding to a second block of samples of the audio signal and/or one or more sets of aliasing reduced subband samples out of sets of aliasing reduced subband samples corresponding to a second block of samples of the audio signal, to obtain one or more time-frequency transformed aliasing reduced subband samples, each of which represents the same region in the time-frequency plane than a corresponding one of the one or more aliasing reduced subband samples corresponding to the other block of samples of the audio signal or one or more time-frequency transformed versions thereof. Further, the audio processor comprises an inverse time domain aliasing reduction stage configured to perform weighted combinations of corresponding sets of aliasing reduced subband samples or time-frequency transformed versions thereof, to obtain an aliased subband representation. Further, the audio processor comprises a first inverse time-frequency transform stage configured to time-frequency transform the aliased subband representation, to obtain sets of subband samples corresponding to the first block of samples of the audio signal and sets of subband samples corresponding to the second block of samples of the audio signal, wherein a time-frequency transform applied by the first inverse time-frequency transform stage is inverse to the time-frequency transform applied by the second inverse time-frequency transform stage. Further, the audio processor comprises a cascaded inverse lapped critically sampled transform stage configured to perform a cascaded inverse lapped critically sampled transform on the sets of samples, to obtain a set of samples associated with a block of samples of the audio signal.

Further embodiments provide a method for processing an audio signal to obtain a subband representation of the audio signal. The method comprises a step of performing a cascaded lapped critically sampled transform on at least two partially overlapping blocks of samples of the audio signal, to obtain sets of subband samples on the basis of a first block of samples of the audio signal, and to obtain sets of subband samples on the basis of a second block of samples of the audio signal. Further, the method comprises a step of identifying, in case that the sets of subband samples that are based on the first block of samples represent different regions in a time-frequency plane compared to the sets of subband samples that are based on the second block of samples, one or more sets of subband samples out of the sets of subband samples that are based on the first block of samples and one or more sets of subband samples out of the sets of subband samples that are based on the second block of samples that in combination represent the same region of the time-frequency plane. Further, the method comprises a step of performing time-frequency transforms on the identified one or more sets of subband samples out of the sets of subband samples that are based on the first block of samples and/or the identified one or more sets of subband samples out of the sets of subband samples that are based on the second block of samples, to obtain one or more time-frequency transformed subband samples, each of which represents the same region in the time-frequency plane than a corresponding one of the identified one or more subband samples or one or more time-frequency transformed versions thereof. Further, the method comprises a step of performing a weighted combination of two corresponding sets of subband samples or time-frequency transformed versions thereof, one obtained on the basis of the first block of samples of the audio signal and one obtained on the basis on the second block of samples of the audio signal, to obtain aliasing reduced subband representations of the audio signal.

Further embodiments provide a method for processing a subband representation of an audio signal to obtain the audio signal, the subband representation of the audio signal comprising aliasing reduced sets of samples. The method comprises a step of performing a time-frequency transforms on one or more sets of aliasing reduced subband samples out of sets of aliasing reduced subband samples corresponding to a second block of samples of the audio signal and/or one or more sets of aliasing reduced subband samples out of sets of aliasing reduced subband samples corresponding to a second block of samples of the audio signal, to obtain one or more time-frequency transformed aliasing reduced subband samples, each of which represents the same region in the time-frequency plane than a corresponding one of the one or more aliasing reduced subband samples corresponding to the other block of samples of the audio signal or one or more time-frequency transformed versions thereof. Further, the method comprises a step of performing weighted combinations of corresponding sets of aliasing reduced subband samples or time-frequency transformed versions thereof, to obtain an aliased subband representation. Further, the method comprises a step of performing time-frequency transforms on the aliased subband representation, to obtain sets of subband samples corresponding to the first block of samples of the audio signal and sets of subband samples corresponding to the second block of samples of the audio signal, wherein a time-frequency transform applied by the first inverse time-frequency transform stage is inverse to the time-frequency transform applied by the second inverse time-frequency transform stage. Further, the method comprises a step of performing a cascaded inverse lapped critically sampled transform on the sets of samples, to obtain a set of samples associated with a block of samples of the audio signal.

According to the concept of the present invention time-domain aliasing reduction between two frames of different time-frequency tilings is allowed by introducing another symmetric subband merging/subband splitting step that equalizes the time-frequency tilings of the two frames. After equalizing the tilings, time-domain aliasing reduction can be applied and the original tilings can be reconstructed.

Embodiments provide a Switched Time Domain Aliasing Reduction (STDAR) filterbank with unilateral or bilateral STDAR.

In embodiments, STDAR parameters can be derived from MDCT length parameters (e.g., mergefactor (MF) parameters. For example, when using unilateral STDAR, 1 bit may be transmitted per mergefactor. This bit may signal whether the mergefactor of frame m or m−1 is used for STDAR. Alternatively, the transformation can be performed towards the higher mergefactor. In this case, the bit may be omitted.

In embodiments, joint channel processing, e.g. M/S or multi-channel coding tool (MCT) [10], can be performed. For example, some or all of the channels may be transformed based on bilateral STDAR towards the same TDAR layout and jointly processed. Varying factors, such as 2, 8, 1, 2, 16, 32 presumably are not as probable as uniform factors, such as 4, 4, 8, 8, 16, 16. This correlation can be exploited to reduce the amount of data needed, e.g., by means of differential coding.

In embodiments, less mergefactors may be transmitted, wherein omitted mergefactors may be derived or interpolated from neighboring mergefactors. For example, if the mergefactors actually are as uniform as described in the previous paragraph, all mergefactors may be interpolated based on a few mergefactors.

In embodiments, a bilateral STDAR factor can be signaled in the bitstream. For example, some bits in the bitstream are needed to signal the STDAR factor describing the current frame limit. These bits may be entropy encoded. Additionally, these bits may be coded among each other.

Further embodiments provide an audio processor for processing an audio signal to obtain a subband representation of the audio signal. The audio processor comprises a cascaded lapped critically sampled transform stage and a time domain aliasing reduction stage. The cascaded lapped critically sampled transform stage is configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. The time domain aliasing reduction stage is configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal.

Further embodiments provide an audio processor for processing a subband representation of an audio signal to obtain the audio signal. The audio processor comprises an inverse time domain aliasing reduction stage and a cascaded inverse lapped critically sampled transform stage. The inverse time domain aliasing reduction stage is configured to perform a weighted (and shifted) combination of two corresponding aliasing reduced subband representations (of different blocks of partially overlapping samples) of the audio signal, to obtain an aliased subband representation, wherein the aliased subband representation is a set of subband samples. The cascaded inverse lapped critically sampled transform stage is configured to perform a cascaded inverse lapped critically sampled transform on the set of subband samples, to obtain a set of samples associated with a block of samples of the audio signal.

According to the concept of the present invention, an additional post-processing stage is added to the lapped critically sampled transform (e.g., MDCT) pipeline, the additional post-processing stage comprising another lapped critically sampled transform (e.g., MDCT) along the frequency axis and a time domain aliasing reduction along each subband time axis. This allows extracting arbitrary frequency scales from the lapped critically sampled transform (e.g., MDCT) spectrogram with an improved temporal compactness of the impulse response, while introducing no additional redundancy and a reduced lapped critically sampled transform frame delay.

Further embodiments provide a method for processing an audio signal to obtain a subband representation of the audio signal. The method comprises

- performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and
- performing a weighted combination of two corresponding sets of subband samples, one obtained on the basis of the first block of samples of the audio signal and one obtained on the basis on the second block of samples of the audio signal, to obtain an aliasing reduced subband representation of the audio signal.

Further embodiments provide a method for processing a subband representation of an audio signal to obtain the audio signal. The method comprises:

- performing a weighted (and shifted) combination of two corresponding aliasing reduced subband representations (of different blocks of partially overlapping samples) of the audio signal, to obtain an aliased subband representation, wherein the aliased subband representation is a set of subband samples; and
- performing a cascaded inverse lapped critically sampled transform on the set of subband samples, to obtain a set of samples associated with a block of samples of the audio signal.

Advantageous implementations are addressed in the dependent claims.

Subsequently, advantageous implementations of the audio processor for processing an audio signal to obtain a subband representation of the audio signal are described.

In embodiments, the cascaded lapped critically sampled transform stage can be a cascaded MDCT (MDCT=modified discrete cosine transform), MDST (MDST=modified discrete sine transform) or MLT (MLT=modulated lapped transform) stage.

In embodiments, the cascaded lapped critically sampled transform stage can comprise a first lapped critically sampled transform stage configured to perform lapped critically sampled transforms on a first block of samples and a second block of samples of the at least two partially overlapping blocks of samples of the audio signal, to obtain a first set of bins for the first block of samples and a second set of bins (lapped critically sampled coefficients) for the second block of samples.

The first lapped critically sampled transform stage can be a first MDCT, MDST or MLT stage.

The cascaded lapped critically sampled transform stage can further comprise a second lapped critically sampled transform stage configured to perform a lapped critically sampled transform on a segment (proper subset) of the first set of bins and to perform a lapped critically sampled transform on a segment (proper subset) of the second set of bins, each segment being associated with a subband of the audio signal, to obtain a set of subband samples for the first set of bins and a set of subband samples for the second set of bins.

The second lapped critically sampled transform stage can be a second MDCT, MDST or MLT stage.

Thereby, the first and second lapped critically sampled transform stages can be of the same type, i.e. one out of MDCT, MDST or MLT stages.

In embodiments, the second lapped critically sampled transform stage can be configured to perform lapped critically sampled transforms on at least two partially overlapping segments (proper subsets) of the first set of bins and to perform lapped critically sampled transforms on at least two partially overlapping segments (proper subsets) of the second set of bins, each segment being associated with a subband of the audio signal, to obtain at least two sets of subband samples for the first set of bins and at least two sets of subband samples for the second set of bins.

Thereby, the first set of subband samples can be a result of a first lapped critically sampled transform on the basis of the first segment of the first set of bins, wherein a second set of subband samples can be a result of a second lapped critically sampled transform on the basis of the second segment of the first set of bins, wherein a third set of subband samples can be a result of a third lapped critically sampled transform on the basis of the first segment of the second set of bins, wherein a fourth set of subband samples can be a result of a fourth lapped critically sampled transform on the basis of the second segment of the second set of bins. The time domain aliasing reduction stage can be configured to perform a weighted combination of the first set of subband samples and the third set of subband samples, to obtain a first aliasing reduced subband representation of the audio signal, and to perform a weighted combination of the second set of subband samples and the fourth set of subband samples, to obtain a second aliasing reduced subband representation of the audio signal.

In embodiments, the cascaded lapped critically sampled transform stage can be configured to segment a set of bins obtained on the basis of the first block of samples using at least two window functions and to obtain at least two sets of subband samples based on the segmented set of bins corresponding to the first block of samples, wherein the cascaded lapped critically sampled transform stage can be configured to segment a set of bins obtained on the basis of the second block of samples using the at least two window functions and to obtain at least two sets of subband samples based on the segmented set of bins corresponding to the second block of samples, wherein the at least two window functions comprise different window width.

In embodiments, the cascaded lapped critically sampled transform stage can be configured to segment a set of bins obtained on the basis of the first block of samples using at least two window functions and to obtain at least two sets of subband samples based on the segmented set of bins corresponding to the first block of samples, wherein the cascaded lapped critically sampled transform stage can be configured to segment a set of bins obtained on the basis of the second block of samples using the at least two window functions and to obtain at least two sets of subband samples based on the segmented set of bins corresponding to the second block of samples, wherein filter slopes of the window functions corresponding to adjacent sets of subband samples are symmetric.

In embodiments, the cascaded lapped critically sampled transform stage can be configured to segment the samples of the audio signal into the first block of samples and the second block of samples using a first window function, wherein the lapped critically sampled transform stage can be configured to segment a set of bins obtained on the basis of the first block of samples and a set of bins obtained on the basis of the second block of samples using a second window function, to obtain the corresponding subband samples, wherein the first window function and the second window function comprise different window width.

In embodiments, the cascaded lapped critically sampled transform stage can be configured to segment the samples of the audio signal into the first block of samples and the second block of samples using a first window function, wherein the lapped critically sampled transform stage can be configured to segment a set of bins obtained on the basis of the first block of samples and a set of bins obtained on the basis of the second block of samples using a second window function, to obtain the corresponding subband samples, wherein a window width of the first window function and a window width of the second window function are different from each other, wherein the window width of the first window function and the window width of the second window function differ from each other by a factor different from a power of two.

Subsequently, advantageous implementations of the audio processor for processing a subband representation of an audio signal to obtain the audio signal are described.

In embodiments, the inverse cascaded lapped critically sampled transform stage can be an inverse cascaded MDCT (MDCT=modified discrete cosine transform), MDST (MDST=modified discrete sine transform) or MLT (MLT=modulated lapped transform) stage.

In embodiments, the cascaded inverse lapped critically sampled transform stage can comprise a first inverse lapped critically sampled transform stage configured to perform an inverse lapped critically sampled transform on the set of subband samples, to obtain a set of bins associated with a given subband of the audio signal.

The first inverse lapped critically sampled transform stage can be a first inverse MDCT, MDST or MLT stage.

In embodiments, the cascaded inverse lapped critically sampled transform stage can comprise a first overlap and add stage configured to perform a concatenation of a set of bins associated with a plurality of subbands of the audio signal, which comprises a weighted combination of the set of bins associated with the given subband of the audio signal with a set of bins associated with another subband of the audio signal, to obtain a set of bins associated with a block of samples of the audio signal.

In embodiments, the cascaded inverse lapped critically sampled transform stage can comprise a second inverse lapped critically sampled transform stage configured to perform an inverse lapped critically sampled transform on the set of bins associated with the block of samples of the audio signal, to obtain a set of samples associated with the block of samples of the audio signal.

The second inverse lapped critically sampled transform stage can be a second inverse MDCT, MDST or MLT stage.

Thereby, the first and second inverse lapped critically sampled transform stages can be of the same type, i.e. one out of inverse MDCT, MDST or MLT stages.

In embodiments, the cascaded inverse lapped critically sampled transform stage can comprise a second overlap and add stage configured to overlap and add the set of samples associated with the block of samples of the audio signal and another set of samples associated with another block of samples of the audio signal, the block of samples and the another block of samples of the audio signal partially overlapping, to obtain the audio signal.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
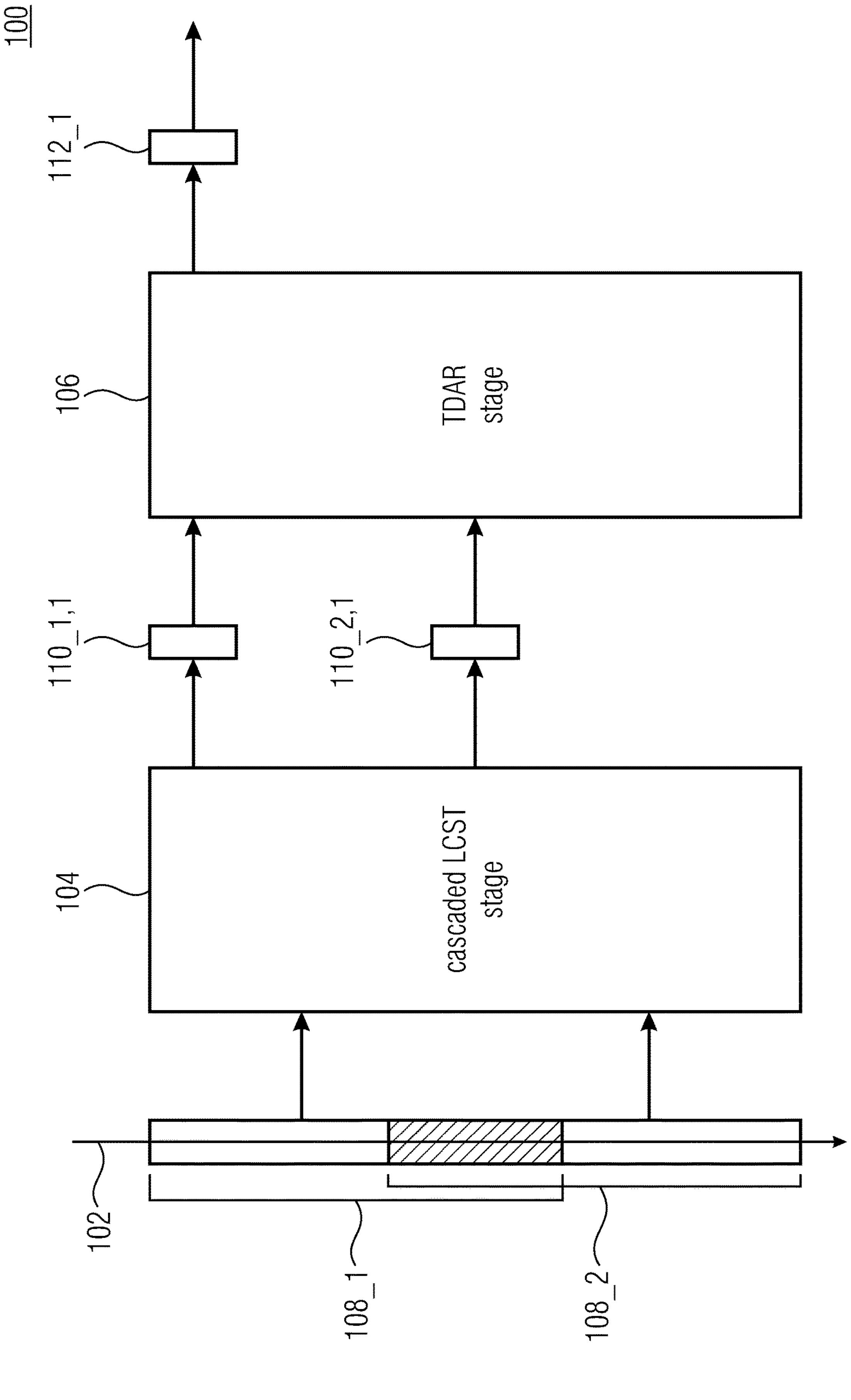
FIG. 1 shows a schematic block diagram of an audio processor configured to process an audio signal to obtain a subband representation of the audio signal, according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

First, in section 1, a nonuniform orthogonal filterbank based on cascading two MDCT and time domain aliasing reduction (TDAR) is described, which is able to achieve impulse responses that were compact in both time and frequency [1]. Afterwards, in section 2, Switched Time Domain Aliasing Reduction (STDAR) is described, which allows TDAR between two frames of different time-frequency tilings. This is achieved by introducing another symmetric subband merging/subband splitting step that equalizes the time-frequency tilings of the two frames. After equalizing the tilings, regular TDAR is applied and the original tilings are reconstructed.

1. Nonuniform Orthogonal Filterbank Based on Cascading Two MDCT and Time Domain Aliasing Reduction (TDAR)

FIG. 1 shows a schematic block diagram of an audio processor 100 configured to process an audio signal 102 to obtain a subband representation of the audio signal, according to an embodiment. The audio processor 100 comprises a cascaded lapped critically sampled transform (LCST) stage 104 and a time domain aliasing reduction (TDAR) stage 106.

The cascaded lapped critically sampled transform stage 104 is configured to perform a cascaded lapped critically sampled transform on at least two partially overlapping blocks 108_1 and 108_2 of samples of the audio signal 102, to obtain a set 110_1,1 of subband samples on the basis of a first block 108_1 of samples (of the at least two overlapping blocks 108_1 and 108_2 of samples) of the audio signal 102, and to obtain a corresponding set 110_2,1 of subband samples on the basis of a second block 108_2 of samples (of the at least two overlapping blocks 108_1 and 108_2 of samples) of the audio signal 102.

The time domain aliasing reduction stage 104 is configured to perform a weighted combination of two corresponding sets 110_1,1 and 110_2,1 of subband samples (i.e., subband samples corresponding to the same subband), one obtained on the basis of the first block 108_1 of samples of the audio signal 102 and one obtained on the basis of the second block 108_2 of samples of the audio signal, to obtain an aliasing reduced subband representation 112_1 of the audio signal 102.

In embodiments, the cascaded lapped critically sampled transform stage 104 can comprise at least two cascaded lapped critically sampled transform stages, or in other words, two lapped critically sampled transform stages connected in a cascaded manner.

The cascaded lapped critically sampled transform stage can be a cascaded MDCT (MDCT=modified discrete cosine transform) stage. The cascaded MDCT stage can comprise at least two MDCT stages.

Naturally, the cascaded lapped critically sampled transform stage also can be a cascaded MDST (MDST=modified discrete sine transform) or MLT (MLT=modulated lap transform) stage, comprising at least two MDST or MLT stages, respectively.

The two corresponding sets of subband samples 110_1,1 and 110_2,1 can be subband samples corresponding to the same subband (i.e. frequency band).

Figure 2:
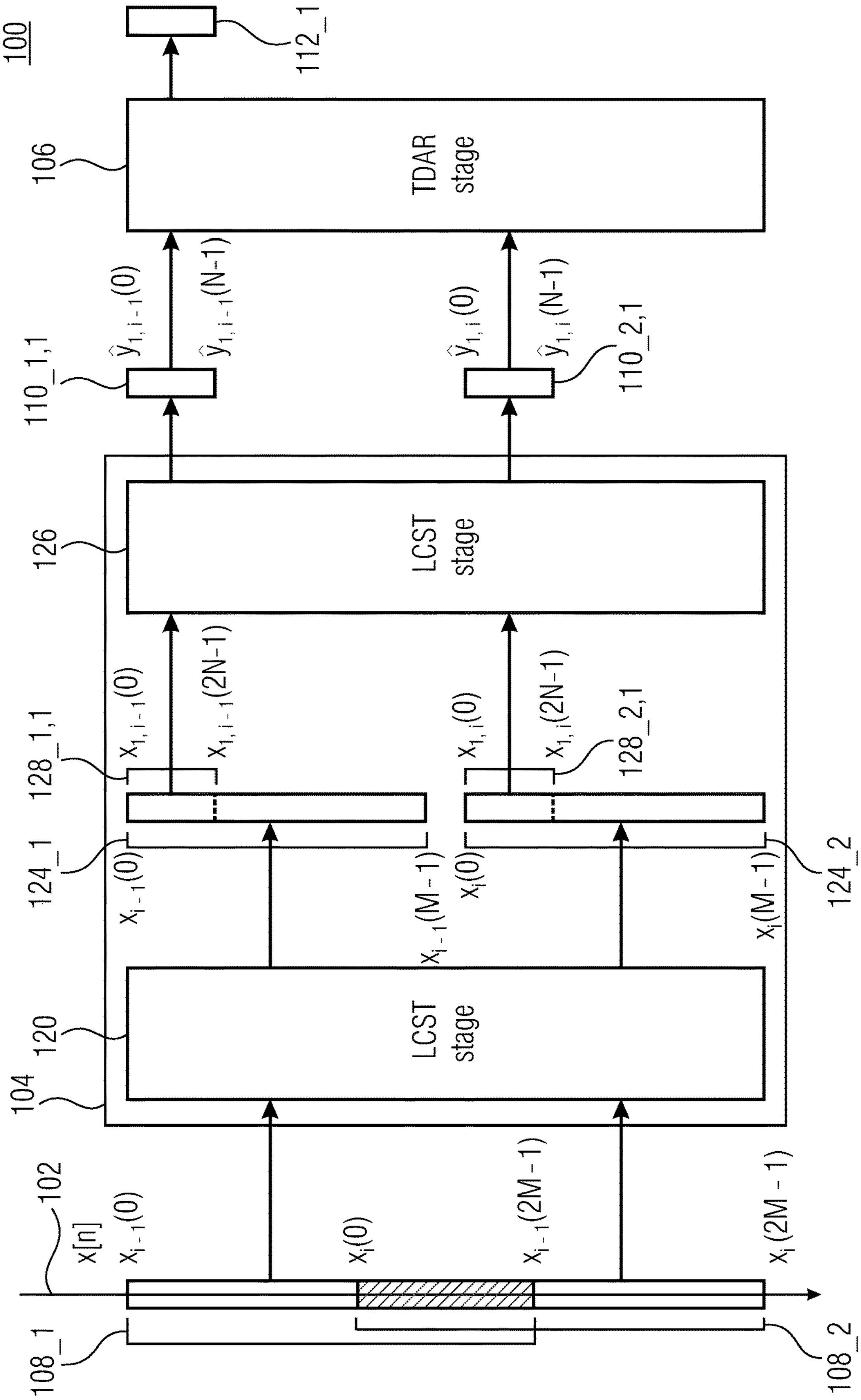
FIG. 2 shows a schematic block diagram of an audio processor configured to process an audio signal to obtain a subband representation of the audio signal, according to a further embodiment.

FIG. 2 shows a schematic block diagram of an audio processor 100 configured to process an audio signal 102 to obtain a subband representation of the audio signal, according to a further embodiment.

As shown in FIG. 2, the cascaded lapped critically sampled transform stage 104 can comprise a first lapped critically sampled transform stage 120 configured to perform lapped critically sampled transforms on a first block 108_1 of (2M) samples ($x_{i-1}(n)$, $0 \leq n \leq 2M-1$) and a second block 108_2 of (2M) samples ($x_i(n)$, $0 \leq n \leq 2M-1$) of the at least two partially overlapping blocks 108_1 and 108_2 of samples of the audio signal 102, to obtain a first set 124_1 of (M) bins (LCST coefficients) ($X_{i-1}(k)$, $0 \leq k \leq M-1$) for the first block 108_1 of samples and a second set 124_2 of (M) bins (LCST coefficients) (Xi(k), $0 \leq k \leq M-1$) for the second block 108_2 of samples.

The cascaded lapped critically sampled transform stage 104 can comprise a second lapped critically sampled transform stage 126 configured to perform a lapped critically sampled transform on a segment 128_1,1 (proper subset) ($X_{v,i-1}(k)$) of the first set 124_1 of bins and to perform a lapped critically sampled transform on a segment 128_2,1 (proper subset) ($X_{v,i}(k)$) of the second set 124_2 of bins, each segment being associated with a subband of the audio signal 102, to obtain a set 110_1,1 of subband samples [$\hat{y}_{v,i-1}(m)$] for the first set 124_1 of bins and a set 110_2,1 of subband samples ($\hat{y}_{v,i}(m)$) for the second set 124_2 of bins.

Figure 3:
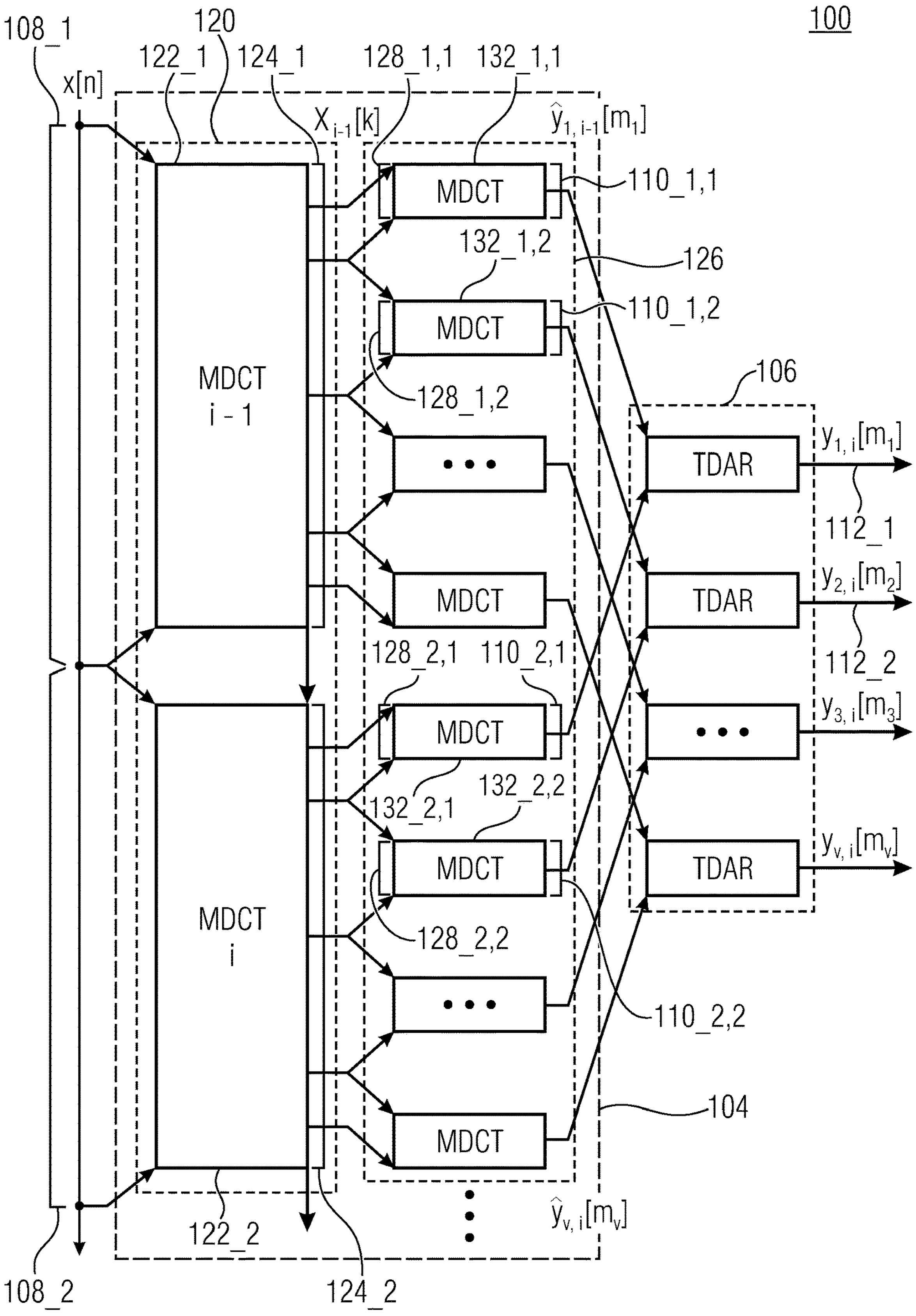
FIG. 3 shows a schematic block diagram of an audio processor configured to process an audio signal to obtain a subband representation of the audio signal, according to a further embodiment.

FIG. 3 shows a schematic block diagram of an audio processor 100 configured to process an audio signal 102 to obtain a subband representation of the audio signal, according to a further embodiment. In other words, FIG. 3 shows a diagram of the analysis filterbank. Thereby, appropriate window functions are assumed. Observe that for simplicity reasons in FIG. 3 (only) the processing of a first half of a subband frame (y[m], 0<=m<N/2) (i.e. only the first line of equation (6)) is indicated.

As shown in FIG. 3, the first lapped critically sampled transform stage 120 can be configured to perform a first lapped critically sampled transform 122_1 (e.g., MDCT i−1) on the first block 108_1 of (2M) samples ($x_{i-1}(n)$, $0 \leq n \leq 2M-1$), to obtain the first set 124_1 of (M) bins (LCST coefficients) ($X_{i-1}(k)$, $0 \leq k \leq M-1$) for the first block 108_1 of samples, and to perform a second lapped critically sampled transform 122_2 (e.g., MDCT i) on the second block 108_2 of (2M) samples ($x_i(n)$, $0 \leq n \leq 2M-1$), to obtain a second set 124_2 of (M) bins (LCST coefficients) (Xi(k), $0 \leq k \leq M-1$) for the second block 108_2 of samples.

In detail, the second lapped critically sampled transform stage 126 can be configured to perform lapped critically sampled transforms on at least two partially overlapping segments 128_1,1 and 128_1,2 (proper subsets) ($X_{v,i-1}(k)$) of the first set 124_1 of bins and to perform lapped critically sampled transforms on at least two partially overlapping segments 128_2,1 and 128_2,2 (proper subsets) ($X_{v,i}(k)$) of the second set of bins, each segment being associated with a subband of the audio signal, to obtain at least two sets 110_1,1 and 110_1,2 of subband samples ($\hat{y}_{v,i-1}(m)$) for the first set 124_1 of bins and at least two sets 110_2,1 and 110_2,2 of subband samples ($\hat{y}_{v,i}(m)$) for the second set 124_2 of bins.

For example, the first set 110_1,1 of subband samples can be a result of a first lapped critically sampled transform 132_1,1 on the basis of the first segment 132_1,1 of the first set 124_1 of bins, wherein the second set 110_1,2 of subband samples can be a result of a second lapped critically sampled 132_1,2 transform on the basis of the second segment 128_1,2 of the first set 124_1 of bins, wherein the third set 110_2,1 of subband samples can be a result of a third lapped critically sampled transform 132_2,1 on the basis of the first segment 128_2,1 of the second set 124_2 of bins, wherein the fourth set 110_2,2 of subband samples can be a result of a fourth lapped critically sampled transform 132_2,2 on the basis of the second segment 128_2,2 of the second set 124_2 of bins.

Thereby, the time domain aliasing reduction stage 106 can be configured to perform a weighted combination of the first set 110_1,1 of subband samples and the third set 110_2,1 of subband samples, to obtain a first aliasing reduced subband representation 112_1 ($y_{1,i}[m_1]$) of the audio signal, wherein the domain aliasing reduction stage 106 can be configured to perform a weighted combination of the second set 110_1,2 of subband samples and the fourth set 110_2,2 of subband samples, to obtain a second aliasing reduced subband representation 112_2 ($y_{2,i}[m_2]$) of the audio signal.

Figure 4:
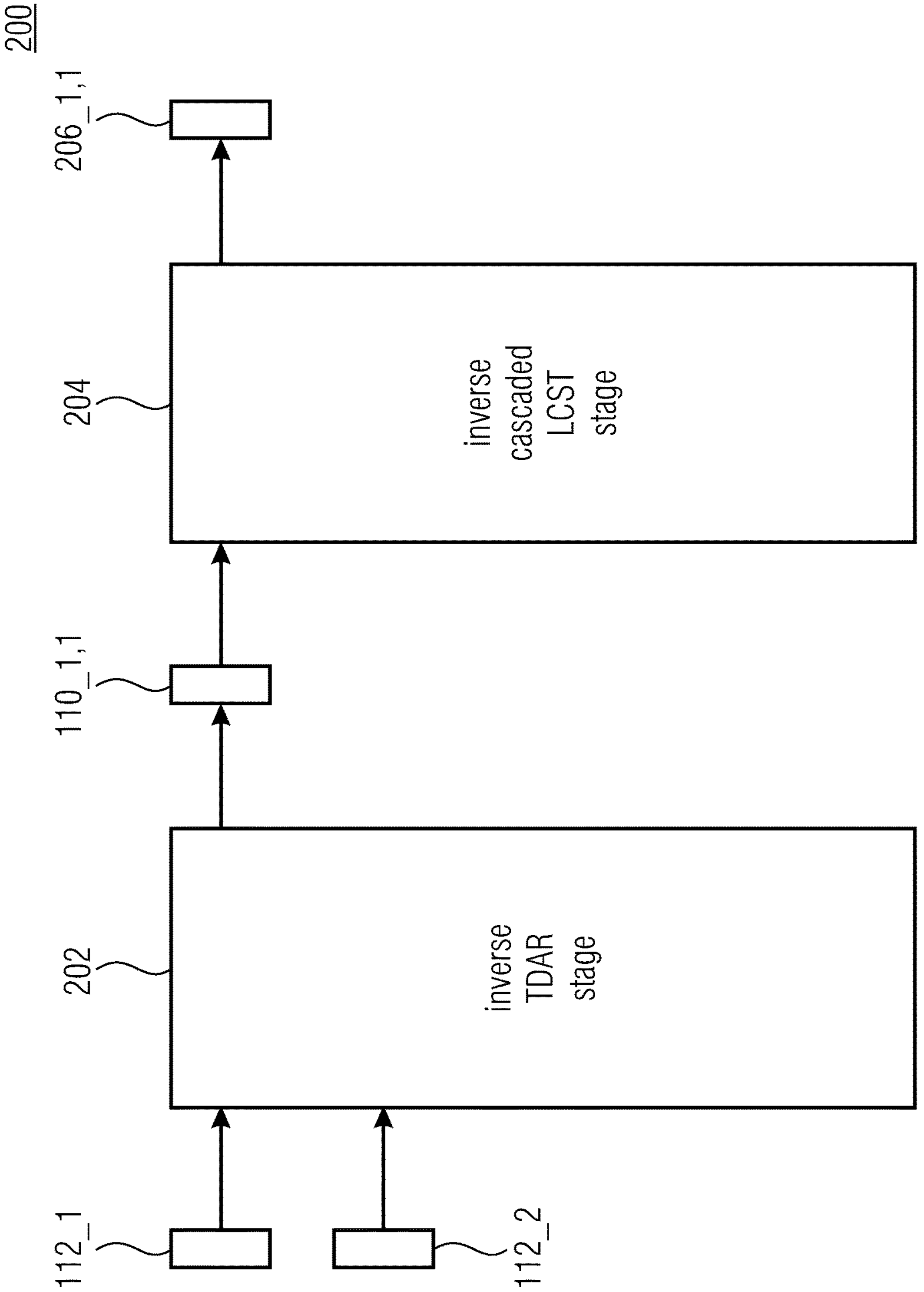
FIG. 4 shows a schematic block diagram of an audio processor for processing a subband representation of an audio signal to obtain the audio signal, according to an embodiment.

FIG. 4 shows a schematic block diagram of an audio processor 200 for processing a subband representation of an audio signal to obtain the audio signal 102, according to an embodiment. The audio processor 200 comprises an inverse time domain aliasing reduction (TDAR) stage 202 and a cascaded inverse lapped critically sampled transform (LCST) stage 204.

The inverse time domain aliasing reduction stage 202 is configured to perform a weighted (and shifted) combination of two corresponding aliasing reduced subband representations 112_1 and 112_2 ($y_{v,i}(m)$, $y_{v,i-1}(m)$) of the audio signal 102, to obtain an aliased subband representation 110_1 ($\hat{y}_{v,i}(m)$), wherein the aliased subband representation is a set 110_1 of subband samples.

The cascaded inverse lapped critically sampled transform stage 204 is configured to perform a cascaded inverse lapped critically sampled transform on the set 110_1 of subband samples, to obtain a set of samples associated with a block 108_1 of samples of the audio signal 102.

Figure 5:
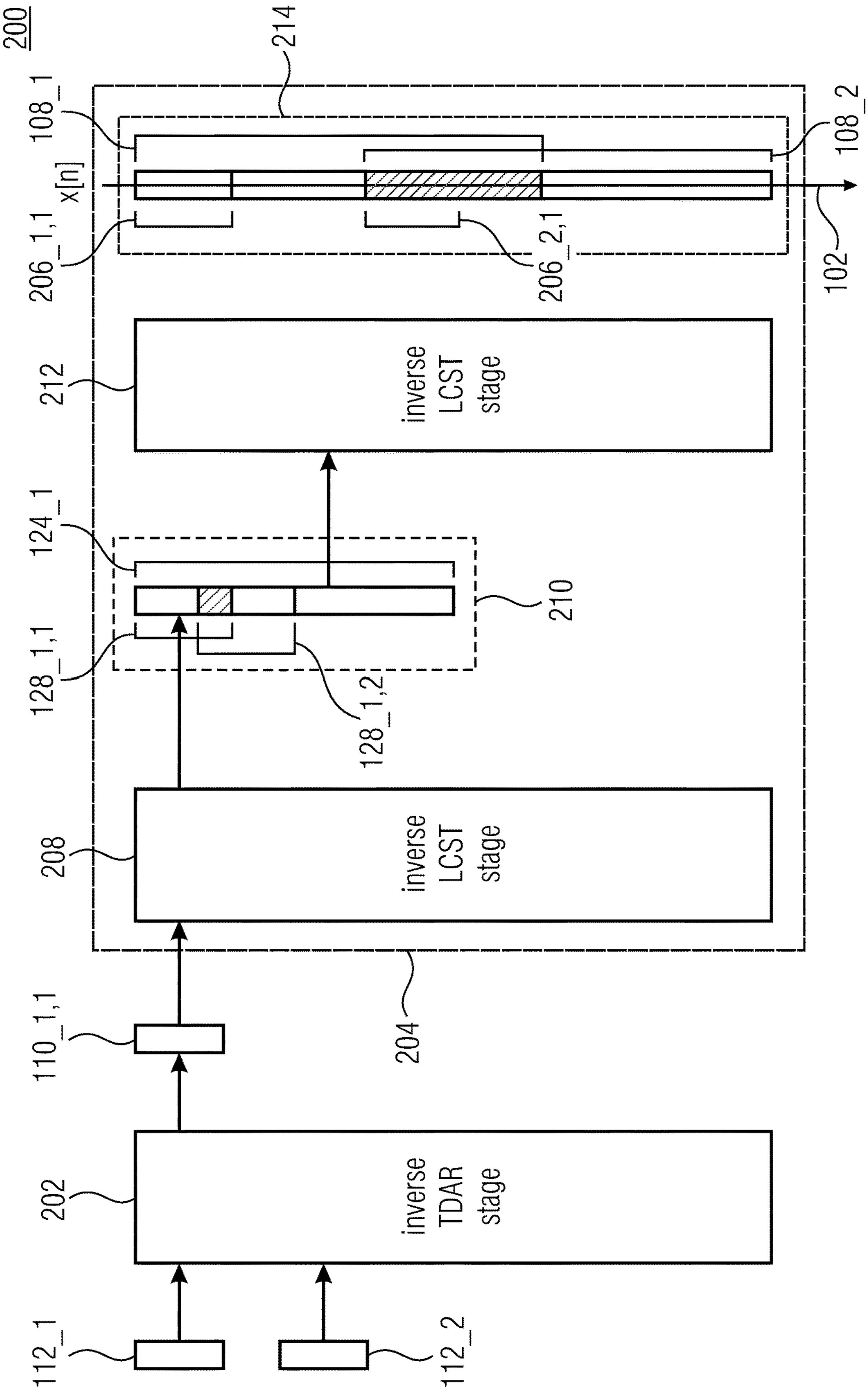
FIG. 5 shows a schematic block diagram of an audio processor for processing a subband representation of an audio signal to obtain the audio signal, according to a further embodiment.

FIG. 5 shows a schematic block diagram of an audio processor 200 for processing a subband representation of an audio signal to obtain the audio signal 102, according to a further embodiment. The cascaded inverse lapped critically sampled transform stage 204 can comprise a first inverse lapped critically sampled transform (LCST) stage 208 and a first overlap and add stage 210.

The first inverse lapped critically sampled transform stage 208 can be configured to perform an inverse lapped critically sampled transform on the set 110_1,1 of subband samples, to obtain a set 128_1,1 of bins associated with a given subband of the audio signal ($\hat{X}$v,i(k)).

The first overlap and add stage 210 can be configured to perform a concatenation of sets of bins associated with a plurality of subbands of the audio signal, which comprises a weighted combination of the set 128_1,1 of bins ($\hat{X}_{v,i}(k)$) associated with the given subband (v) of the audio signal 102 with a set 128_1,2 of bins ($\hat{X}_{v-1,i}(k)$) associated with another subband (v−1) of the audio signal 102, to obtain a set 124_1 of bins associated with a block 108_1 of samples of the audio signal 102.

As shown in FIG. 5, the cascaded inverse lapped critically sampled transform stage 204 can comprise a second inverse lapped critically sampled transform (LCST) stage 212 configured to perform an inverse lapped critically sampled transform on the set 124_1 of bins associated with the block 108_1 of samples of the audio signal 102, to obtain a set 206_1,1 of samples associated with the block 108_1 of samples of the audio signal 102.

Further, the cascaded inverse lapped critically sampled transform stage 204 can comprise a second overlap and add stage 214 configured to overlap and add the set 206_1,1 of samples associated with the block 108_1 of samples of the audio signal 102 and another set 206_2,1 of samples associated with another block 108_2 of samples of the audio signal, the block 108_1 of samples and the another block 108_2 of samples of the audio signal 102 partially overlapping, to obtain the audio signal 102.

Figure 6:
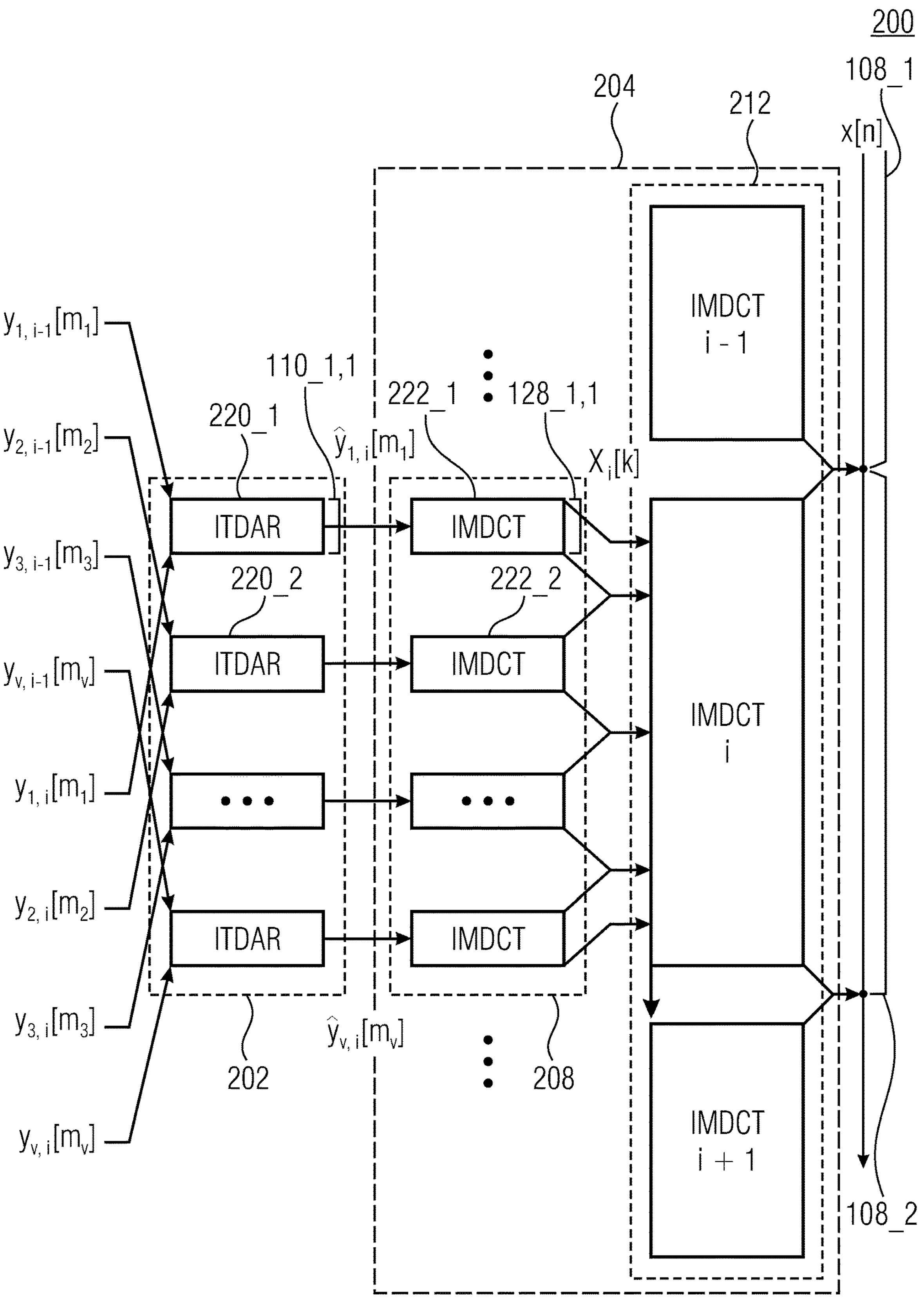
FIG. 6 shows a schematic block diagram of an audio processor for processing a subband representation of an audio signal to obtain the audio signal, according to a further embodiment.

FIG. 6 shows a schematic block diagram of an audio processor 200 for processing a subband representation of an audio signal to obtain the audio signal 102, according to a further embodiment. In other words, FIG. 6 shows a diagram of the synthesis filter bank. Thereby, appropriate windows functions are assumed. Observe that for simplicity reasons in FIG. 6 (only) the processing of a first half of a subband frame (y[m], 0<=m<N/2) (i.e. only the first line of equation (6)) is indicated.

As described above, the audio processor 200 comprises an inverse time domain aliasing reduction stage 202 and an inverse cascades lapped critically sampled stage 204 comprising a first inverse lapped critically sampled stage 208 and a second inverse lapped critically sampled stage 212.

The inverse time domain reduction stage 104 is configured to perform a first weighted and shifted combination 220_1 of a first and second aliasing reduced subband representations $y_{1,i-1}[m_1]$ and $y_{1,i}[m_1]$ to obtain a first aliased subband representation 110_1,1 $\hat{y}_{1,i}[m_1]$, wherein the aliased subband representation is a set of subband samples, and to perform a second weighted and shifted combination 220_2 of a third and fourth aliasing reduced subband representations $y_{2,i-1}[m_1]$ and $y_{2,i}[m_1]$ to obtain a second aliased subband representation 110_2,1 $\hat{y}_{2,i}[m_1]$, wherein the aliased subband representation is a set of subband samples.

The first inverse lapped critically sampled transform stage 208 is configured to perform a first inverse lapped critically sampled transform 222_1 on the first set of subband samples 110_1,1 $\hat{y}_{1,i}[m_1]$ to obtain a set 128_1,1 of bins associated with a given subband of the audio signal ($\hat{X}_{1,1}(k)$), and to perform a second inverse lapped critically sampled transform 222_2 on the second set of subband samples 110_2,1 $\hat{y}_{2,i}[m_1]$ to obtain a set 128_2,1 of bins associated with a given subband of the audio signal ($\hat{X}_{2,1}(k)$).

The second inverse lapped critically sampled transform stage 212 is configured to perform an inverse lapped critically sampled transform on an overlapped and added set of bins obtained by overlapping and adding the sets of bins 128_1,1 and 128_21 provided by the first inverse lapped critically sampled transform stage 208, to obtain the block of samples 108_2.

Subsequently, embodiments of the audio processors shown in FIGS. 1 to 6 are described in which it is exemplarily assumed that the cascaded lapped critically sampled transform stage 104 is a MDCT stage, i.e. the first and second lapped critically sampled transform stages 120 and 126 are MDCT stages, and the inverse cascaded lapped critically sampled transform stage 204 is an inverse cascaded MDCT stage, i.e. the first and second inverse lapped critically sampled transform stages 120 and 126 are inverse MDCT stages. Naturally, the following description is also applicable to other embodiments of the cascaded lapped critically sampled transform stage 104 and inverse lapped critically sampled transform stage 204, such as to a cascaded MDST or MLT stage or an inverse cascaded MDST or MLT stage.

Thereby, the described embodiments may work on a sequence of MDCT spectra of limited length and use MDCT and time domain aliasing reduction (TDAR) as the subband merging operation. The resulting non-uniform filterbank is lapped, orthogonal and allows for subband widths k=2n with n∈N. Due to TDAR, a both temporally and spectral more compact subband impulse response can be achieved.

Subsequently, embodiments of the filterbank are described.

The filterbank implementation directly builds upon common lapped MDCT transformation schemes: The original transform with overlap and windowing remains unchanged.

Without loss of generality the following notation assumes orthogonal MDCT transforms, e.g.

where analysis and synthesis windows are identical.

$$x_i(n) = x(n + iM) \quad 0 \le n \le 2M \tag{1}$$

$$X_i(k) = \sqrt{\frac{2}{M}} \sum_{n=0}^{2M-1} h(n) x_i(n) \kappa(k, n, M) \quad 0 \le k < M \tag{2}$$

where k(k,n,M) is the MDCT transform kernel and h(n) a suitable analysis window $$\kappa(k, n, M) = \cos\left[\frac{\pi}{M}\left(k + \frac{1}{2}\right)\left(n + \frac{M+1}{2}\right)\right]. \tag{3}$$

The output of this transform $X_i(k)$ is then segmented into $\upsilon$ subbands of individual widths $N_v$ and transformed again using MDCT. This results in a filterbank with overlap in both temporal and spectral direction.

For sake of simpler notation herein one common merge factor N for all subbands is used, however any valid MDCT window switching/sequencing can be used to implement the desired time-frequency resolution. More on resolution design below.

$$X_{v,i}(k) = X_i(k + vN) \quad 0 \le k \le 2N \tag{4}$$

$$\hat{y}_{v,i}(m) = \sqrt{\frac{2}{M}} \sum_{k=0}^{2N-1} w(k) X_{v,i}(k) \kappa(m, k, N) \quad 0 \le m < N \tag{5}$$

where w(k) is a suitable analysis window and generally differs from h(n) in size and may differ in window type. Since embodiments apply the window in the frequency domain it is noteworthy though that time- and frequency-selectivity of the window are swapped.

For proper border handling an additional offset of N/2 can be introduced in equation (4), combined with rectangular start/stop window halves at the borders. Again for sake of simpler notation this offset has not been taken into account here.

The output $\hat{y}_{v,i}(m)$ is a list of v vectors of individual lengths $N_v$ of coefficients with corresponding bandwidths $$\pi \frac{N_v}{M}$$

and a temporal resolution proportional to that bandwidth.

These vectors however contain aliasing from the original MDCT transform and consequently show poor temporal compactness. To compensate this aliasing TDAR may be facilitated.

The samples used for TDAR are taken from the two adjacent subband sample blocks v in the current and previous MDCT frame i and i−1. The result is reduced aliasing in the second half of the previous frame and the first half of the second frame.

$$\begin{bmatrix} y_{v,i}(m) \\ y_{v,i-1}(N-1-m) \end{bmatrix} = A \begin{bmatrix} \hat{y}_{v,i}(m) \\ \hat{y}_{v,i-1}(N-1-m) \end{bmatrix} \quad \text{for } 0 \le m < N/2 \tag{6}$$

with $$A = \begin{bmatrix} a_v(m) & b_v(m) \\ c_v(m) & d_v(m) \end{bmatrix} \tag{7}$$

The TDAR coefficients $a_v(m)$, $b_v(m)$, $c_v(m)$ and $d_v(m)$ can be designed to minimize residual aliasing. A simple estimation method based on the synthesis window g(n) will be introduced below.

Also note that if A is nonsingular the operations (6) and (8) correspond to a biorthogonal system. Additionally if g(n)=h(n) and v(k)=w(k), e.g. both MDCTs are orthogonal, and matrix A is orthogonal the overall pipeline constitutes an orthogonal transform.

To calculate the inverse transform, first inverse TDAR is performed, $$\begin{bmatrix} \hat{y}_{v,i}(m) \\ \hat{y}_{v,i-1}(N-1-m) \end{bmatrix} = A^{-1} \begin{bmatrix} y_{v,i}(m) \\ y_{v,i-1}(N-1-m) \end{bmatrix} \tag{8}$$

followed by inverse MDCT and time domain aliasing cancellation (TDAC, albeit the aliasing cancellation is done along the frequency axis here) has to be performed to cancel the aliasing produced in Equation 5

$$\hat{X}_{v,i}(k) = \sqrt{\frac{2}{N}} \sum_{m=0}^{N-1} \hat{y}_{v,i}(m) \kappa(k, m, N) \quad 0 \le k < 2N \tag{9}$$

$$X_{v,i}(k) = v(k+N)\hat{X}_{v-1,i}(k+N) + v(k)\hat{X}_{v,i}(k) \tag{10}$$

$$X_i(k + vN) = X_{v,i}(k). \tag{11}$$

Finally, the initial MDCT in Equation 2 is inverted and again TDAC is performed $$\hat{x}_i(n) = \sqrt{\frac{2}{N}} \sum_{k=0}^{M-1} X_i(k) \kappa(n, k, M) \quad 0 \le k < 2M \tag{12}$$

$$x_i(n) = g(k+M)\hat{x}_{i-1}(n+M) + g(n)\hat{x}_i(n) \tag{13}$$

$$x(n + iM) = x_i(n) \tag{14}$$

Subsequently, time-frequency resolution design limitations are described. While any desired time-frequency resolution is possible, some constraints for designing the resulting window functions has to be adhered to ensure invertibility. In particular, the slopes of two adjacent subbands can be symmetric so that Equation (6) fulfills the Princen Bradley condition [J. Princen, A. Johnson, and A. Bradley, "Subband/transform coding using filter bank designs based on time domain aliasing cancellation," in Acoustics, Speech, and Signal Processing, IEEE International Conference on ICASSP '87., April 1987, vol. 12, pp. 2161-2164]. The window switching scheme as introduced in [B. Edler, "Codierung von Audiosignalen mit überlappender Transformation und adaptiven Fensterfunktionen," Frequenz, vol. 43, pp. 252-256, September 1989], originally designed to combat pre-echo effects, can be applied here. See [Olivier Derrien, Thibaud Necciari, and Peter Balazs, "A quasi-orthogonal, invertible, and perceptually relevant time-frequency transform for audio coding," in EUSIPCO, Nice, France, August 2015.].

Secondly, the sum of all second MDCT transform lengths has to add up to the total length of provided MDCT coefficients. Bands may be chosen not to be transformed using a unit step window with zeros at the desired coefficients. The symmetry properties of the neighboring windows has to be taken care of, though [B. Edler, "Codierung von Audiosignalen mit überlappender Transformation und adaptiven Fensterfunktionen," Frequenz, vol. 43, pp. 252-256, September 1989.]. The resulting transform will yield zeros in these bands so the original coefficients may be directly used.

As a possible time-frequency resolution scalefactor bands from most modern audio coders may directly be used.

Subsequently, the time domain aliasing reduction (TDAR) coefficients calculation is described.

Following the aforementioned temporal resolution, each subband sample corresponds to $M/N_v$ original samples, or an interval $N_v$ times the size as the one of an original sample.

Furthermore the amount of aliasing in each subband sample depends on the amount of aliasing in the interval it is representing. As the aliasing is weighted with the analysis window h(n) using an approximate value of the synthesis window at each subband sample interval is assumed to be a good first estimate for a TDAR coefficient.

Experiments have shown that two very simple coefficient calculation schemes allow for good initial values with improved both temporal and spectral compactness. Both methods are based on a hypothetical synthesis window $g_v(m)$ of length $2N_v$.

1) For parametric windows like Sine or Kaiser Bessel Derived a simple, shorter window of the same type can be defined.

2) For both parametric and tabulated windows with no closed representation the window may be simply cut into $2N_v$ sections of equal size, allowing coefficients to be obtained using the mean value of each section:

$$g_v(m) = \frac{1}{N_v/M}\sum_{n=1}^{N_v/M} g(mN_v/M + n) \qquad 0 \le m < 2N_v \tag{15}$$

Taking the MDCT boundary conditions and aliasing mirroring into account this then yields TDAR coefficients $$a_v(m) = g_v(N/2 + m) \tag{16}$$

$$b_v(m) = -g_v(N/2 - 1 - m) \tag{17}$$

$$c_v(m) = g_v(3N/2 + m) \tag{18}$$

$$d_v(m) = g_v(3N/2 - 1 - m) \tag{19}$$

or in case of an orthogonal transform $$a_v(m) = d_v(m) = g_v(N/2 + m) \tag{20}$$

$$-b_v(m) = c_v(m) = \sqrt{1 - a_v(m)^2}\,. \tag{21}$$

Whatever coefficient approximation solution was chosen, as long as A is nonsingular perfect reconstruction of the entire filterbank is preserved. An otherwise suboptimal coefficient selection will only affect the amount of residual aliasing in the subband signal $y_{v,i}(m)$, however not in the signal x(n) synthesized by the inverse filterbank.

Figure 7:
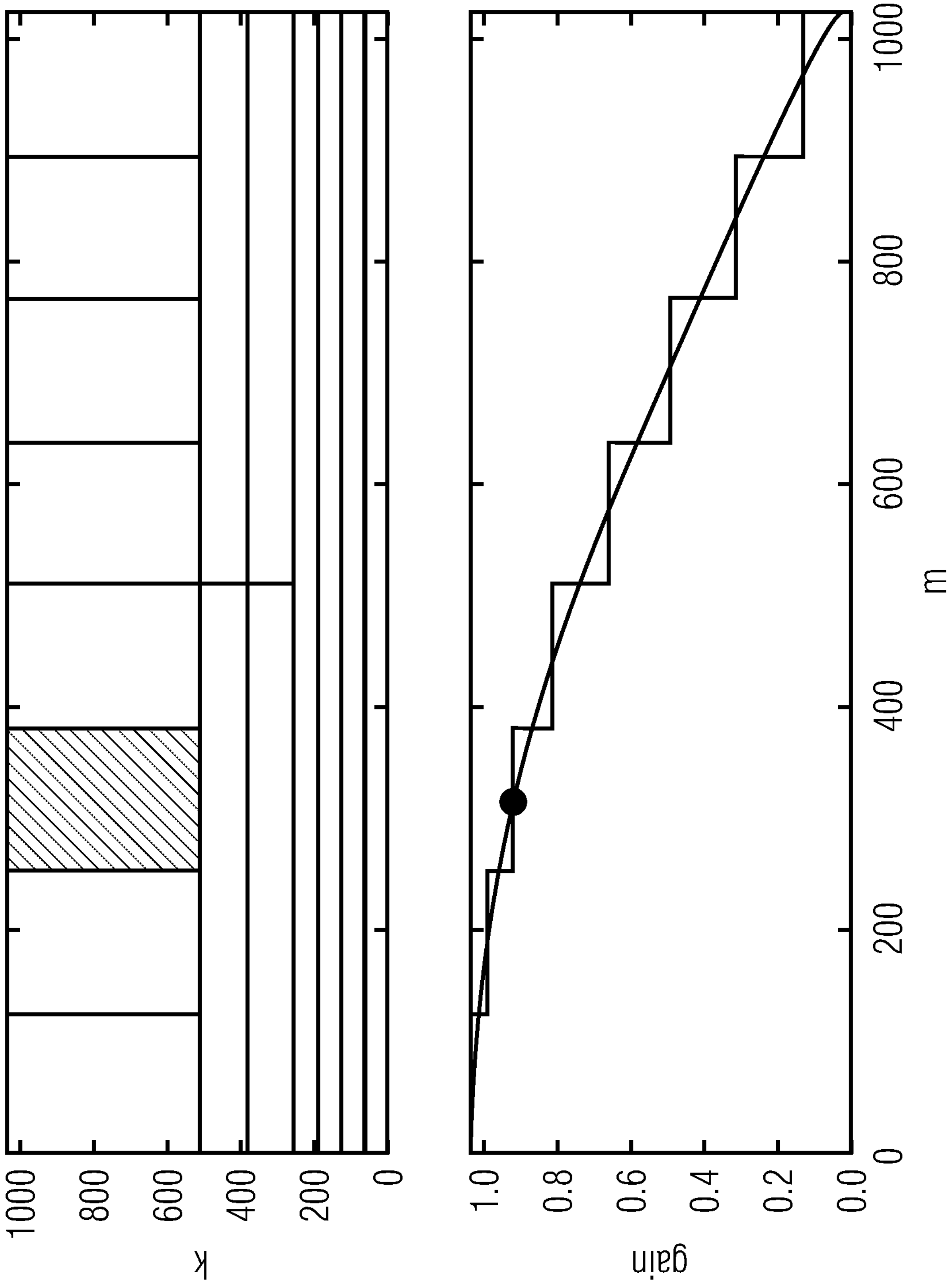
FIG. 7 shows in diagrams an example of subband samples (top graph) and the spread of their samples over time and frequency (below graph)

FIG. 7 shows in diagrams an example of subband samples (top graph) and the spread of their samples over time and frequency (below graph). The annotated sample has wider bandwidth but a shorter time spread than the bottom samples. The analysis windows (bottom graph) have a full resolution of one coefficient per original time sample. The TDAR coefficients thus has to be approximated (annotated by a dot) for each subband samples' time region (m=256::: 384).

Subsequently, (simulation) results are described.

Figure 8:
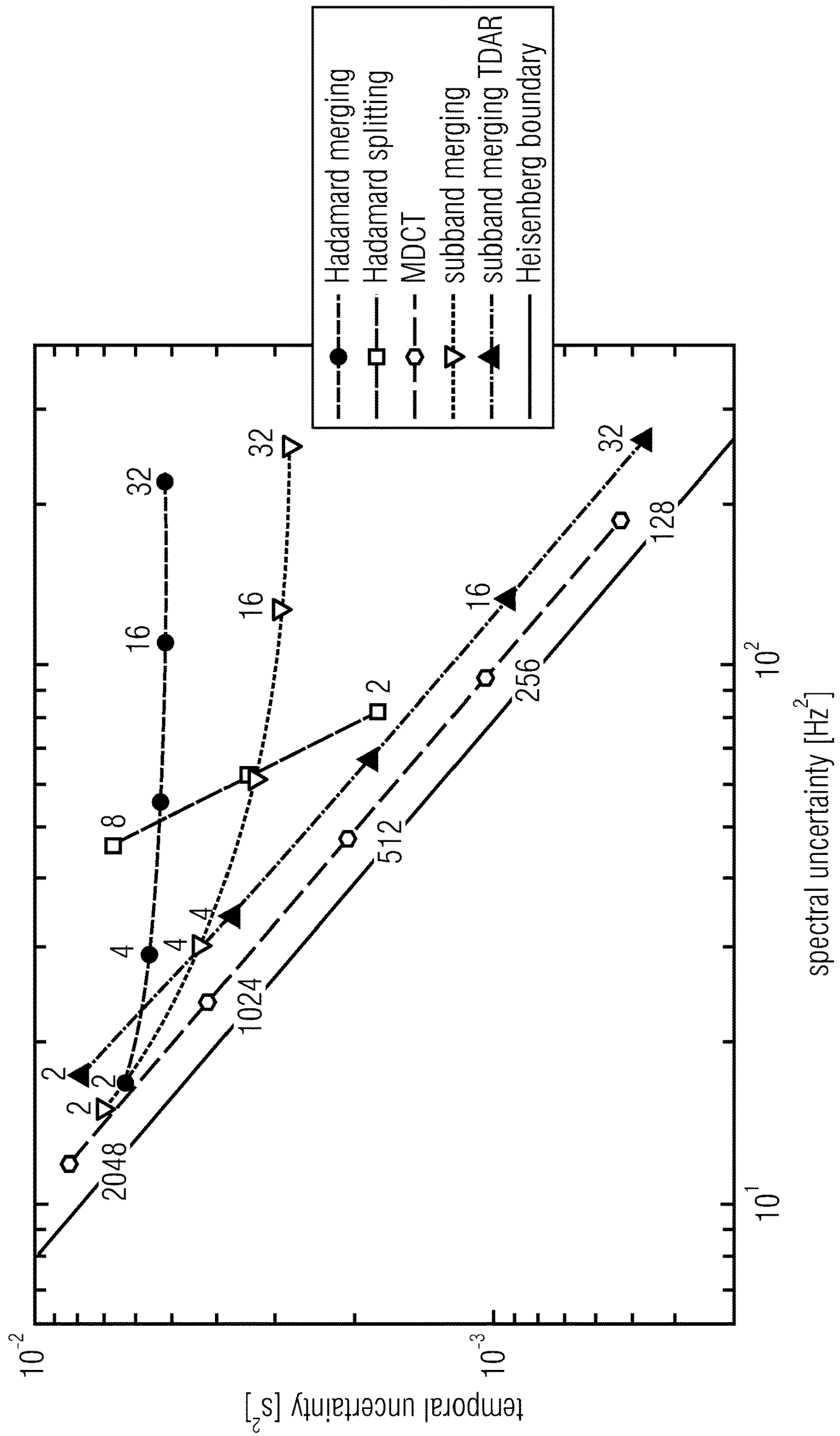
FIG. 8 shows in a diagram the spectral and temporal uncertainty obtained by several different transforms.

FIG. 8 shows the spectral and temporal uncertainty obtained by several different transforms, as shown in [Frederic Bimbot, Ewen Camberlein, and Pierrick Philippe, "Adaptive filter banks using fixed size mdct and subband merging for audio coding-comparison with the mpeg aac filter banks," in Audio Engineering Society Convention 121, October 2006.].

It can be seen that the Hadamard-matrix based transforms offer severely limited time-frequency tradeoff capabilities. For growing merge sizes, additional temporal resolution come at a disproportionally high cost in spectral uncertainty.

In other words, FIG. 8 shows a comparison of spectral and temporal energy compaction of different transforms. Inline labels denote framelengths for MDCT, split factors for Heisenberg Splitting and merge factors for all others.

Subband Merging with TDAR however has a linear tradeoff between temporal and spectral uncertainty, parallel to a plain uniform MDCT. The product of the two is constant, albeit a little bit higher than plain uniform MDCT. For this analysis a Sine analysis window and a Kaiser Bessel Derived subband merging window showed the most compact results and were thusly chosen.

However using TDAR for a merging factor $N_v=2$ seems to decrease both temporal and spectral compactness. We attribute this to the coefficient calculation scheme introduced in Section II-B being too simplistic and not appropriately approximating values for steep window function slopes. A numeric optimization scheme will be presented in a follow-up publication.

These compactness values were calculated using the center of gravity cog and squared effective length $l_{eff}^2$ of the impulse response x[n], defined as [Athanasios Papoulis, Signal analysis, Electrical and electronic engineering series. McGraw-Hill, New York, San Francisco, Paris, 1977.]

$$cogx = \frac{\sum_{n=1}^{N} |x[n]|^2 n^2}{\sum_{n=1}^{N} |x[n]|^2} \tag{22}$$

$$l_{eff}^2 x = \frac{\sum_{n=1}^{N} |x[n]|^2 (n - cogx)^2}{\sum_{n=1}^{N} |x[n]|^2} \tag{23}$$

Shown are the average values of all impulse responses of each individual filterbank.

Figure 9:
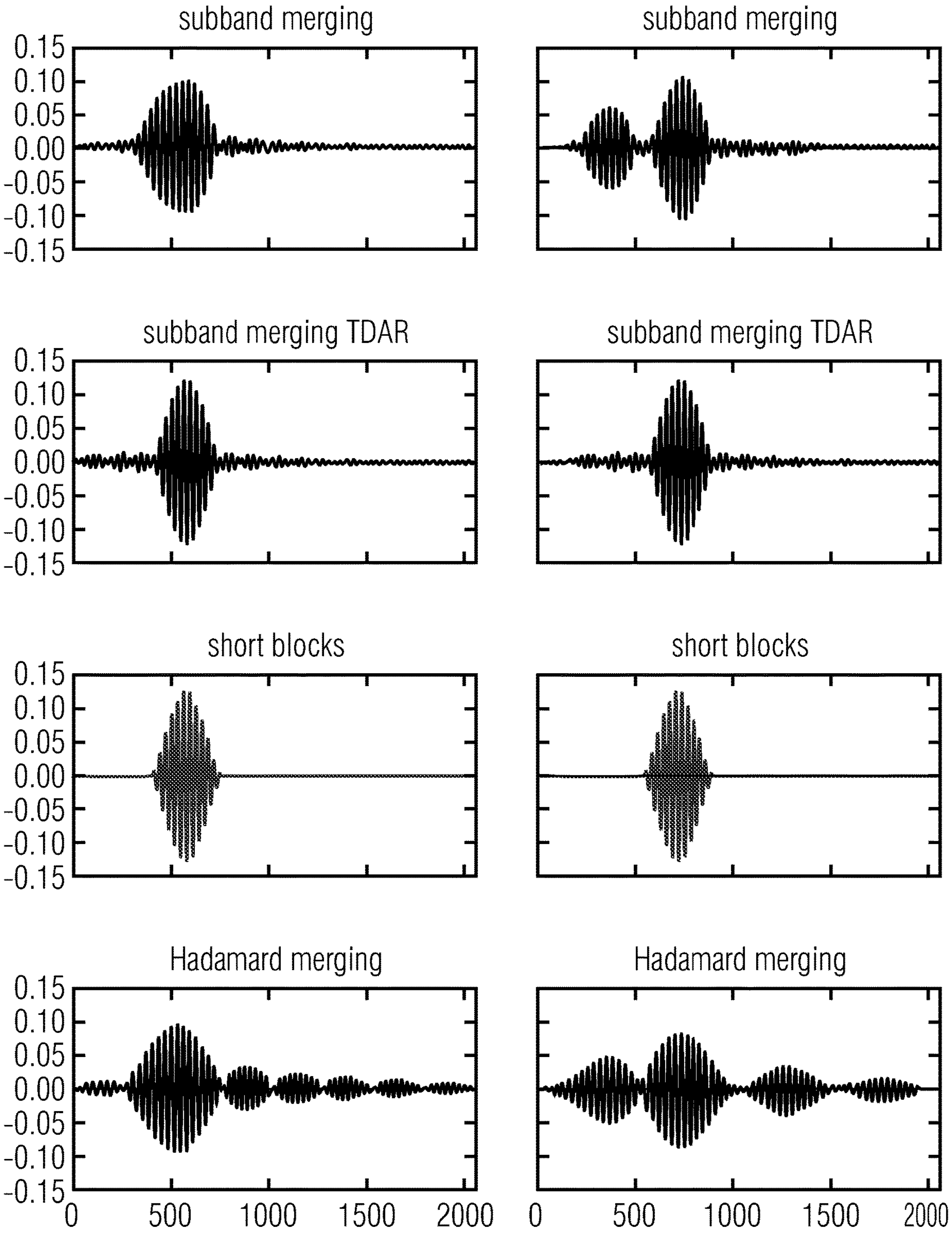
FIG. 9 shows in diagrams shows a comparison of two exemplary impulse responses generated by subband merging with and without TDAR, simple MDCT shortblocks and Hadamard matrix subband merging.

FIG. 9 shows a comparison of two exemplary impulse responses generated by subband merging with and without TDAR, simple MDCT shortblocks and Hadamard matrix subband merging as proposed in [O. A. Niamut and R. Heusdens, "Flexible frequency decompositions for cosine-modulated filter banks," in Acoustics, Speech, and Signal Processing, 2003. Proceedings. (ICASSP '03). 2003 IEEE International Conference on, April 2003, vol. 5, pp. V-449-52 vol. 5.].

The poor temporal compactness of the Hadamard matrix merging transform is clearly visible. Also it can clearly be seen that most of the aliasing artifacts in the subband are significantly reduced by TDAR.

In other words, FIG. 9 shows an exemplary impulse responses of a merged subband filter comprising 8 of 1024 original bins using the method proposed here without TDAR, with TDAR, the method proposed in [O. A. Niamut and R. Heusdens, "Subband merging in cosine-modulated filter banks," Signal Processing Letters, IEEE, vol. 10, no. 4, pp. 111-114, April 2003.] and using a shorter MDCT framelength of 256 samples.

Figure 10:
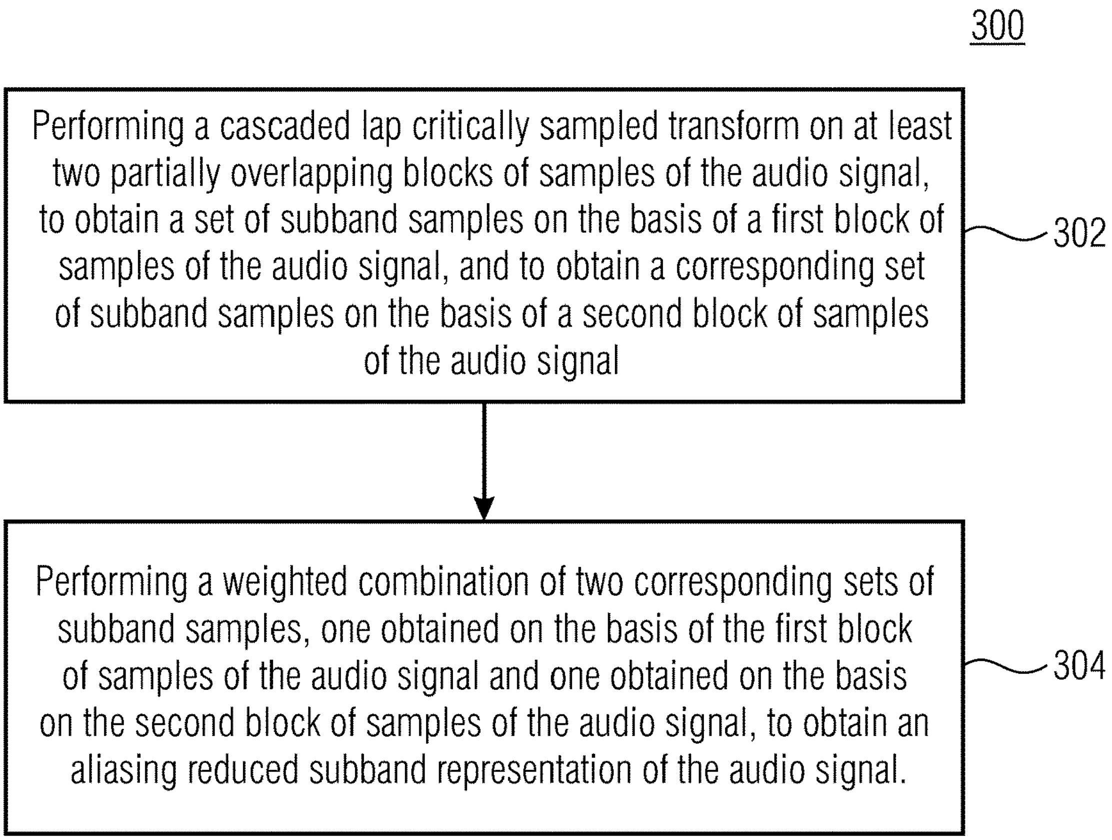
FIG. 10 shows a flowchart of a method for processing an audio signal to obtain a subband representation of the audio signal, according to an embodiment.

FIG. 10 shows a flowchart of a method 300 for processing an audio signal to obtain a subband representation of the audio signal. The method 300 comprises a step 302 of performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. Further, the method 300 comprises a step 304 of performing a weighted combination of two corresponding sets of subband samples, one obtained on the basis of the first block of samples of the audio signal and one obtained on the basis on the second block of samples of the audio signal, to obtain an aliasing reduced subband representation of the audio signal.

Figure 11:
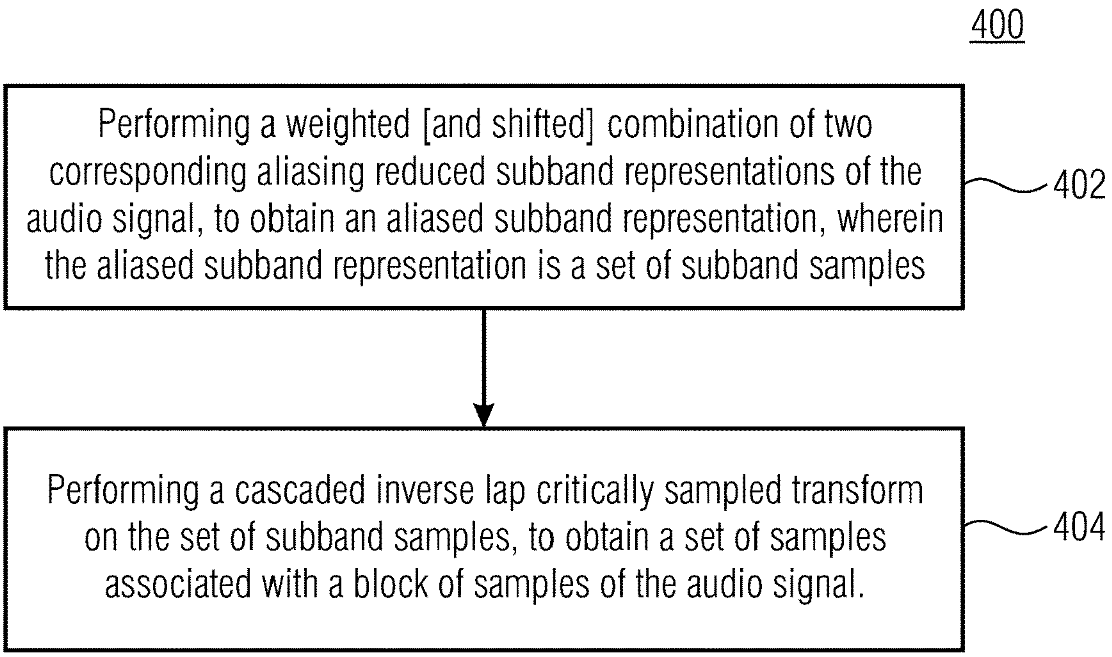
FIG. 11 shows a flowchart of a method for processing a subband representation of an audio signal to obtain the audio signal, according to an embodiment.

FIG. 11 shows a flowchart of a method 400 for processing a subband representation of an audio signal to obtain the audio signal. The method 400 comprises a step 402 of performing a weighted (and shifted) combination of two corresponding aliasing reduced subband representations (of different blocks of partially overlapping samples) of the audio signal, to obtain an aliased subband representation, wherein the aliased subband representation is a set of subband samples. Further, the method 400 comprises a step 404 of performing a cascaded inverse lapped critically sampled transform on the set of subband samples, to obtain a set of samples associated with a block of samples of the audio signal.

Figure 12:
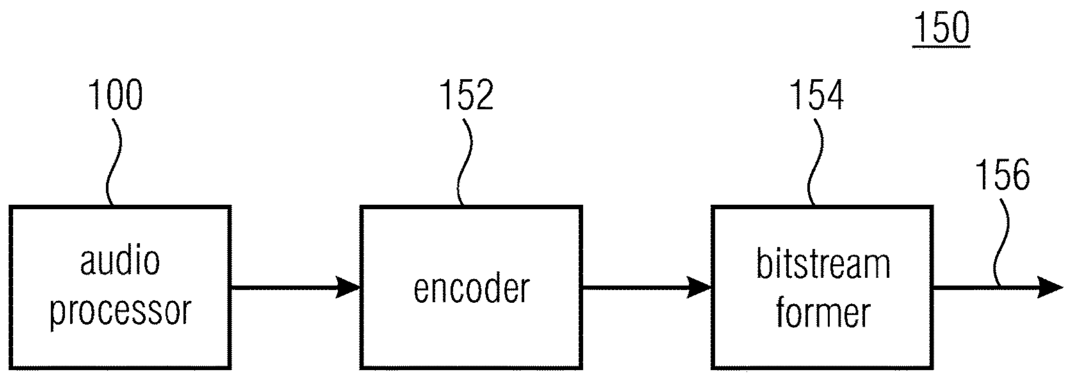
FIG. 12 shows a schematic block diagram of an audio encoder, according to an embodiment.

FIG. 12 shows a schematic block diagram of an audio encoder 150, according to an embodiment. The audio encoder 150 comprises an audio processor (100) as described above, an encoder 152 configured to encode the aliasing reduced subband representation of the audio signal, to obtain an encoded aliasing reduced subband representation of the audio signal, and a bitstream former 154 configured to form a bitstream 156 from the encoded aliasing reduced subband representation of the audio signal.

Figure 13:
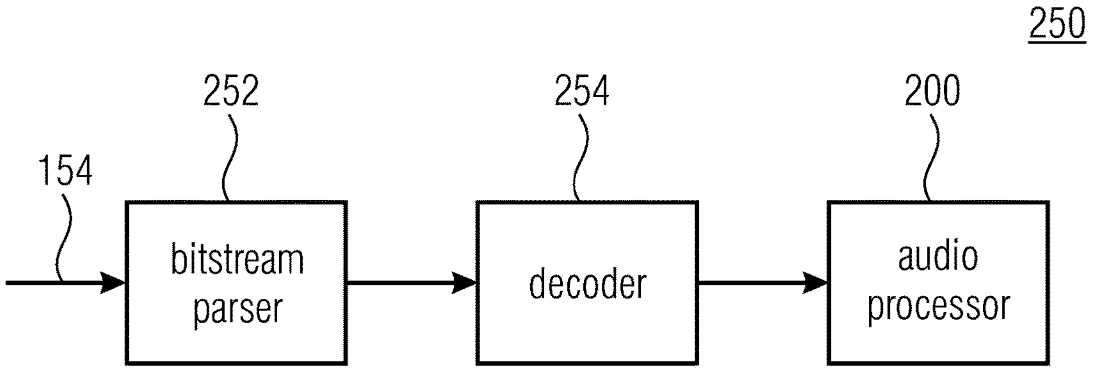
FIG. 13 shows a schematic block diagram of an audio decoder, according to an embodiment.

FIG. 13 shows a schematic block diagram of an audio decoder 250, according to an embodiment. The audio decoder 250 comprises a bitstream parser 252 configured to parse the bitstream 154, to obtain the encoded aliasing reduced subband representation, a decoder 254 configured to decode the encoded aliasing reduced subband representation, to obtain the aliasing reduced subband representation of the audio signal, and an audio processor 200 as described above.

Figure 14:
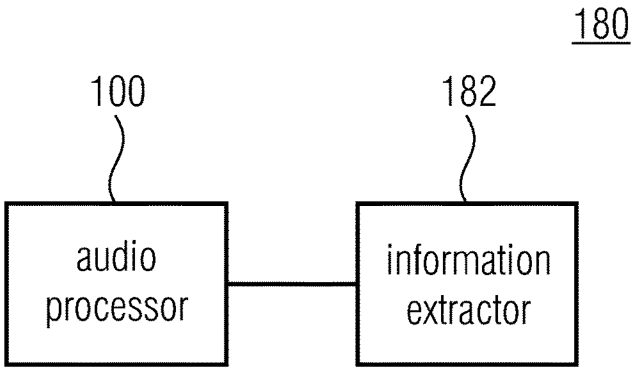
FIG. 14 shows a schematic block diagram of an audio analyzer, according to an embodiment.

FIG. 14 shows a schematic block diagram of an audio analyzer 180, according to an embodiment. The audio analyzer 180 comprises an audio processor 100 as described above, an information extractor 182, configured to analyze the aliasing reduced subband representation, to provide an information describing the audio signal.

Embodiments provide time domain aliasing reduction (TDAR) in subbands of non-uniform orthogonal modified discrete cosine transform (MDCT) filterbanks.

Embodiments add an additional post-processing step to the widely used MDCT transform pipeline, the step itself comprising only another lapped MDCT transform along the frequency axis and time domain aliasing reduction (TDAR) along each subband time axis, allowing to extract arbitrary frequency scales from the MDCT spectrogram with an improved temporal compactness of the impulse response, while introducing no additional redundancy and only one MDCT frame delay.

Figure 15:
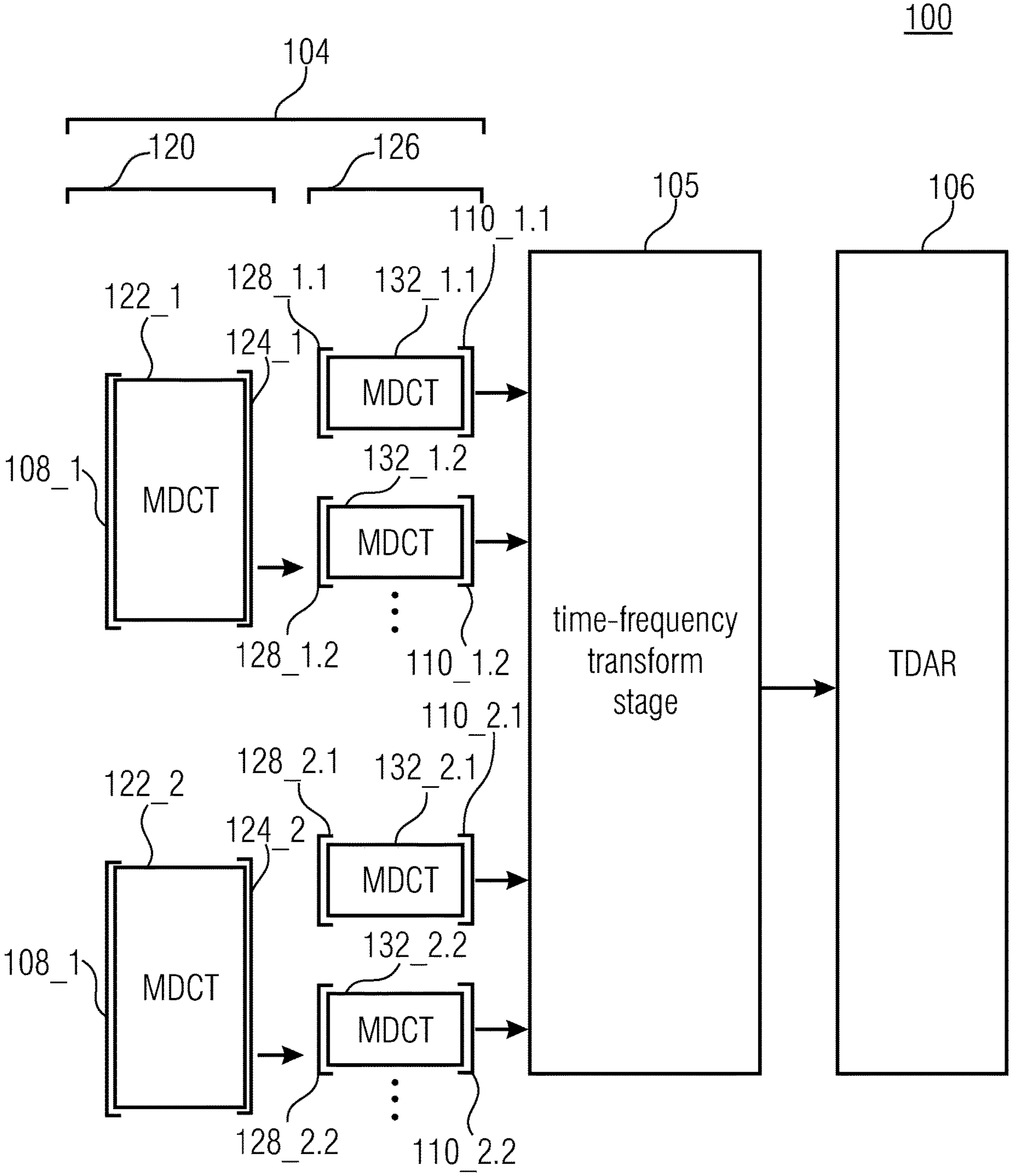
FIG. 15 shows a schematic block diagram of an audio processor configured to process an audio signal to obtain a subband representation of the audio signal, according to a further embodiment.

2. Time-Varying Time-Frequency Tilings Using Non-Uniform Orthogonal Filterbanks Based on MDCT Analysis/Synthesis and TDAR FIG. 15 shows a schematic block diagram of an audio processor 100 configured to process an audio signal to obtain a subband representation of the audio signal, according to a further embodiment. The audio processor 100 comprises the cascaded lapped critically sampled transform (LCST) stage 104 and the time domain aliasing reduction (TDAR) stage 106, both described in detail above in section 1.

The cascaded lapped critically sampled transform stage 104 comprises the first lapped critically sampled transform (LCST) stage 120 configured to perform LCSTs (e.g., MDCTs) 122_1 and 122_2 on the first block 108_1 of samples and the second block 108_2, respectively, to obtain the first set 124_1 of bins for the first block 108_1 of samples and the second set 124_2 of bins for the second block 108_2 of samples. Further, the cascaded lapped critically sampled transform stage 104 comprises the second lapped critically sampled transform (LCST) stage 126 configured to perform LCSTs (e.g., MDCTs) 132_1,1-132_1,2 on segmented sets 128_1,1-128_1,2 of bins of the first set 124_1 of bins and LCSTs (e.g., MDCTs) 132_2,1-132_2,2 on segmented sets 128_2,1-128_2,2 of bins of the second set 124_1 of bins, to obtain sets 110_1,1-110_1,2 of subband samples that are based on the first block 108_1 of samples and sets 110_2,1-110_2,2 of subband samples that are based on the second block 108_1 of samples.

As already indicated in the introductory part, time domain aliasing reduction (TDAR) stage 106 can only apply time domain aliasing reduction (TDAR) if identical time-frequency tiling's are used for the first block 108_1 of samples and the second block 108_2 of samples, i.e. if the sets 110_1,1-110_1,2 of subband samples that are based on the first block 108_1 of samples represent the same regions in a time-frequency plane compared to the sets 110_2,1-110_2,2 of subband samples that are based on the second block 108_2 of samples.

However, if signal characteristics of the input signal change, the LCSTs (e.g., MDCTs) 132_1,1-132_1,2 used for processing the segmented sets 128_1,1-128_1,2 of bins that are based on the first block 108_1 of samples may have different framelength (e.g., mergefactors) compared to the LCSTs (e.g., MDCTs) 132_2,1-132_2,2 used for processing the segmented sets 128_2,1-128_2,2 of bins that are based on the second block 108_2 of samples.

In this case, the sets 110_1,1-110_1,2 of subband samples that are based on the first block 108_1 of samples represent different regions in a time-frequency plane compared to the sets 110_2,1-110_2,2 of subband samples that are based on the second block 108_2 of samples, i.e. if the first set 110_1,1 of subband samples represents a different region in the time-frequency plane than the third set 110_2,1 of subband samples and the second set 110_1,2 of subband samples represents a different region in the time-frequency plane than the fourth set 110_2,1 of subband samples, and time domain aliasing reduction (TDAR) cannot be applied directly.

In order to overcome this limitation, the audio processor 100 further comprises a first time-frequency transform stage 105 configured to identify, in case that the sets 110_1,1-110_1,2 of subband samples that are based on the first block 108_1 of samples represent different regions in the time-frequency plane compared to the sets 110_2,1-110_2,2 of subband samples that are based on the second block 108_2 of samples, one or more sets of subband samples out of the sets 110_1,1-110_1,2 of subband samples that are based on the first block 108_1 of samples and one or more sets of subband samples out of the sets 110_2,1-110_2,2 of subband samples that are based on the second block 108_2 of samples that in combination represent the same region in the time-frequency plane, and to time-frequency transform the identified one or more sets of subband samples out of the sets 110_2,1-110_2,2 of subband samples that are based on the second block 108_2 of samples and/or the identified one or more sets of subband samples out of the sets 110_2,1-110_2,2 of subband samples that are based on the second block 108_2 of samples, to obtain one or more time-frequency transformed subband samples, each of which represents the same region in the time-frequency plane than a corresponding one of the identified one or more subband samples or one or more time-frequency transformed versions thereof.

Afterwards, the time domain aliasing reduction stage 106 can apply time domain reduction (TDAR), i.e. by performing a weighted combination of two corresponding sets of subband samples or time-frequency transformed versions thereof, one obtained on the basis of the first block 108_1 of samples of the audio signal 102 and one obtained on the basis on the second block 108_2 of samples of the audio signal, to obtain aliasing reduced subband representations of the audio signal 102.

In embodiments, the first time-frequency transform stage 105 can be configured to time-frequency transform either the identified one or more sets of subband samples out of the sets 110_2,1-110_2,2 of subband samples that are based on the first block 108_1 of samples or the identified one or more sets of subband samples out of the sets 110_2,1-110_2,2 of subband samples that are based on the second block 108_2 of samples, to obtain one or more time-frequency transformed subband samples, each of which represents the same region in the time-frequency plane than a corresponding one of the identified one or more subband samples.

In this case, the time domain aliasing reduction stage 106 can be configured to perform a weighted combination of a time-frequency transformed set of subband samples and a corresponding (non-time-frequency transformed) set of subband samples, one obtained on the basis of the first block 108_1 of samples of the audio signal 102 and one obtained on the basis on the second block 108_2 of samples of the audio signal. This is referred herein as to unilateral STDAR.

Naturally, the first time-frequency transform stage 105 also can be configured to time-frequency transform both, the identified one or more sets of subband samples out of the sets 110_2,1-110_2,2 of subband samples that are based on the first block 108_1 of samples and the identified one or more sets of subband samples out of the sets 110_2,1-110_2,2 of subband samples that are based on the second block 108_2 of samples, to obtain one or more time-frequency transformed subband samples, each of which represents the same region in the time-frequency plane than a corresponding one of the time-frequency transformed versions of the other identified one or more subband samples.

In this case, the time domain aliasing reduction stage 106 can be configured to perform a weighted combination of two corresponding time-frequency transformed sets of subband samples, one obtained on the basis of the first block 108_1 of samples of the audio signal 102 and one obtained on the basis on the second block 108_2 of samples of the audio signal. This is referred herein as to bilateral STDAR.

Figure 16:
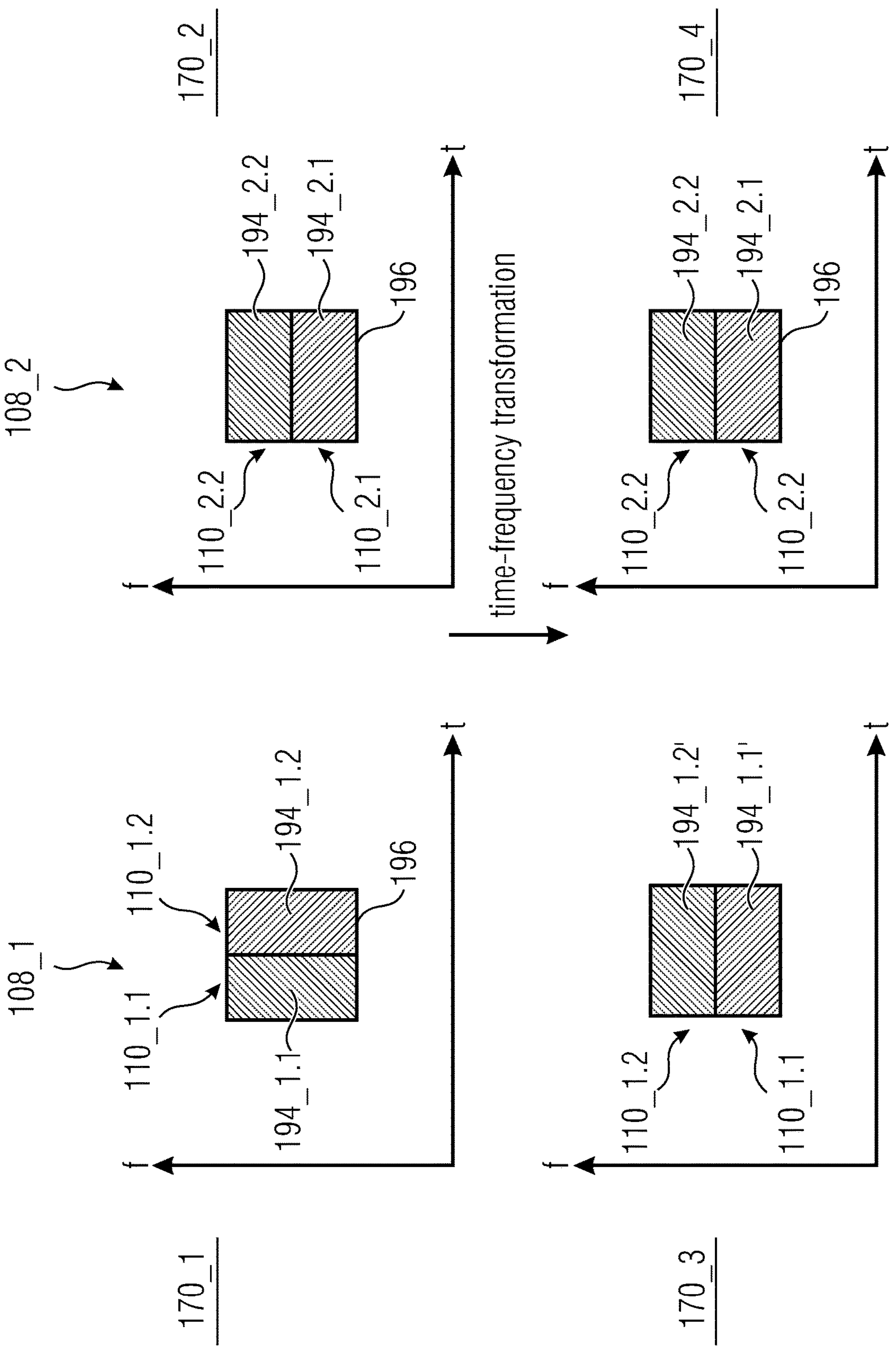
FIG. 16 shows a schematic representation of the time-frequency transformation performed by the time-frequency transform stage in the time-frequency plane.

FIG. 16 shows a schematic representation of the time-frequency transformation performed by the time-frequency transform stage 105 in the time-frequency plane.

As indicated in diagrams 170_1 and 170_2 of FIG. 16, the first set 110_1,1 of subband samples corresponding the first block 108_1 of samples and the third set 110_2,1 of subband samples corresponding to the second block 108_2 of samples represent different regions 194_1,1 and 194_2,1 in the time-frequency plane, such that time domain aliasing reduction stage 106 would not be able to apply time domain aliasing reduction (TDAR) to the first set 110_1,1 of subband samples and the third set 110_2,1 of subband samples.

Similarly, the second set 110_1,2 of subband samples corresponding the first block 108_1 of samples and the fourth set 110_2,2 of subband samples corresponding to the second block 108_2 of samples represent different regions 194_1,2 and 194_2,2 in the time-frequency plane, such that time domain aliasing reduction stage 106 would not be able to apply time domain aliasing reduction (TDAR) to the second set 110_1,2 of subband samples and the fourth set 110_2,2 of subband samples.

However, the first set 110_1,1 of subband samples in combination with the second set 110_1,2 of subband samples represent the same region 196 in the time-frequency plane than the third set 110_2,1 of subband samples in combination with the fourth set 110_2,2 of subband samples.

Thus, the time-frequency transform stage 105 may time-frequency transform the first set 110_1,1 of subband samples and the second set 110_1,2 of subband samples or to time-frequency transform the third set 110_2,1 of subband samples and the fourth set 110_2,2 of subband samples, to obtain time-frequency transformed sets of subband samples, each of which represents the same region in the time-frequency plane than a corresponding one of the other sets of subband samples.

In FIG. 16 it is exemplarily assumed that the time-frequency transform stage 105 time-frequency transforms the first set 110_1,1 of subband samples and the second set 110_1,2 of subband samples, to obtain a first time-frequency transformed set 110_1,1' of subband samples and a second time-frequency transformed set 110_1,2' of subband samples.

As indicated in diagrams 170_3 and 170_4 of FIG. 16, the first time-frequency transformed set 110_1,1' of subband samples and the third set 110_2,1 of subband samples represent the same region 194_1,1' and 194_2,1 in the time-frequency plane, such that time domain aliasing reduction (TDAR) can be applied to the first time-frequency transformed set 110_1,1' of subband samples and the third set 110_2,1 of subband samples.

Similarly, the second time-frequency transformed set 110_1,2' of subband samples and the fourth set 110_2,2 of subband samples represent the same region 194_1,2' and 194_2,3 in the time-frequency plane, such that time domain aliasing reduction (TDAR) can be applied to the second time-frequency transformed set 110_1,2' of subband samples and the fourth set 110_2,2 of subband samples.

Although in FIG. 16 only the first set 110_1,1 of subband samples and the second set 110_1,2 of subband samples corresponding to the first block 108_1 of samples are time-frequency transformed by the first time-frequency transform stage 105, in embodiments, also both, the first set 110_1,1 of subband samples and the second set 110_1,2 of subband samples corresponding to the first block 108_1 of samples and the third set 110_2,1 of subband samples and the fourth set 110_2,2 of subband samples corresponding to the second block 108_1 of samples can be time-frequency transformed by the first time-frequency transform stage 105.

Figure 17:
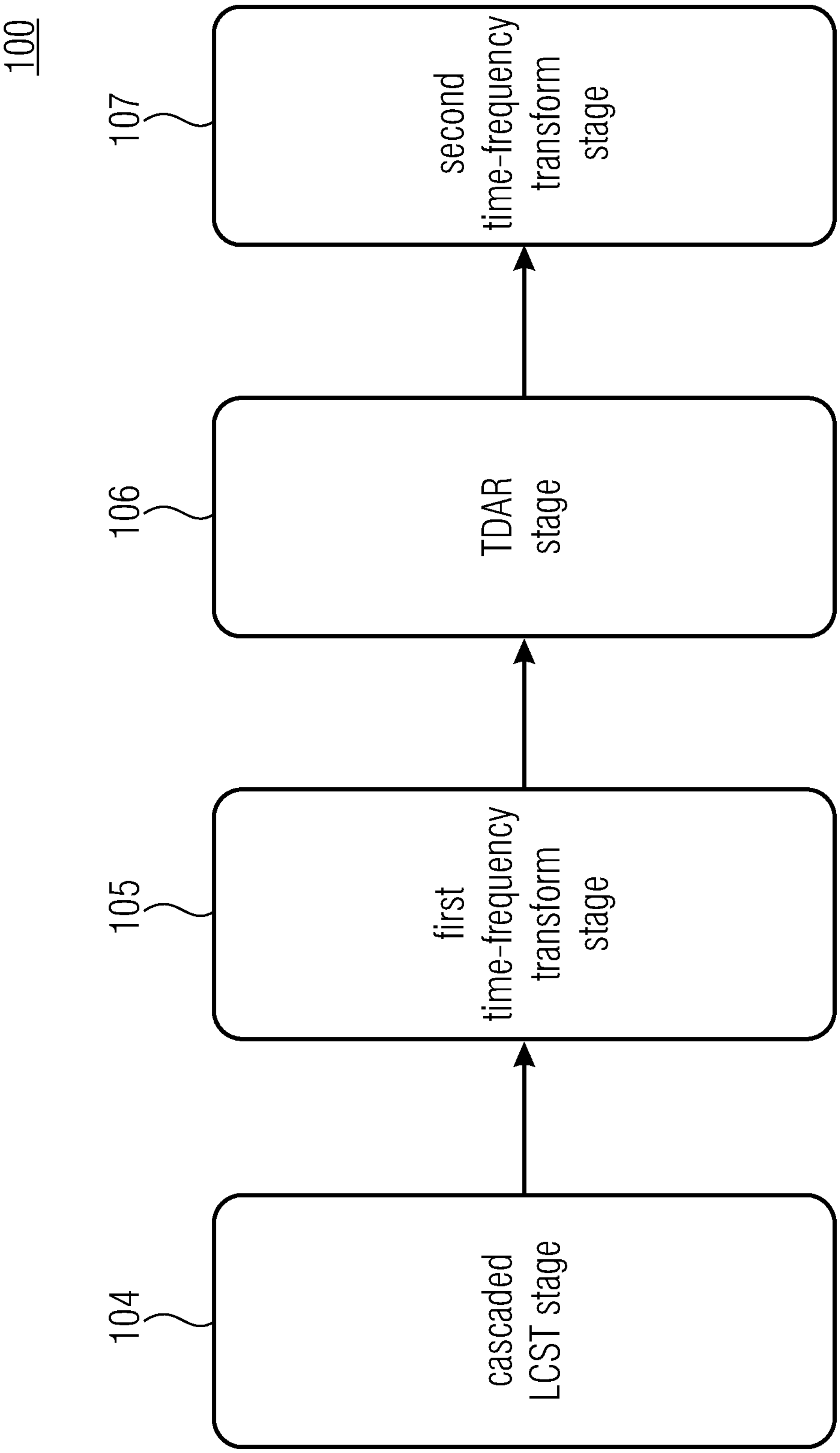
FIG. 17 shows a schematic block diagram of an audio processor configured to process an audio signal to obtain a subband representation of the audio signal, according to a further embodiment.

FIG. 17 shows a schematic block diagram of an audio processor 100 configured to process an audio signal to obtain a subband representation of the audio signal, according to a further embodiment.

As shown in FIG. 17, the audio processor 100 can further comprise a second time-frequency transform stage 107 configured to time frequency-transform the aliasing reduced subband representations of the audio signal, wherein a time-frequency transform applied by the second time-frequency transform stage is inverse to the time-frequency transform applied by the first time-frequency transform stage.

Figure 18:
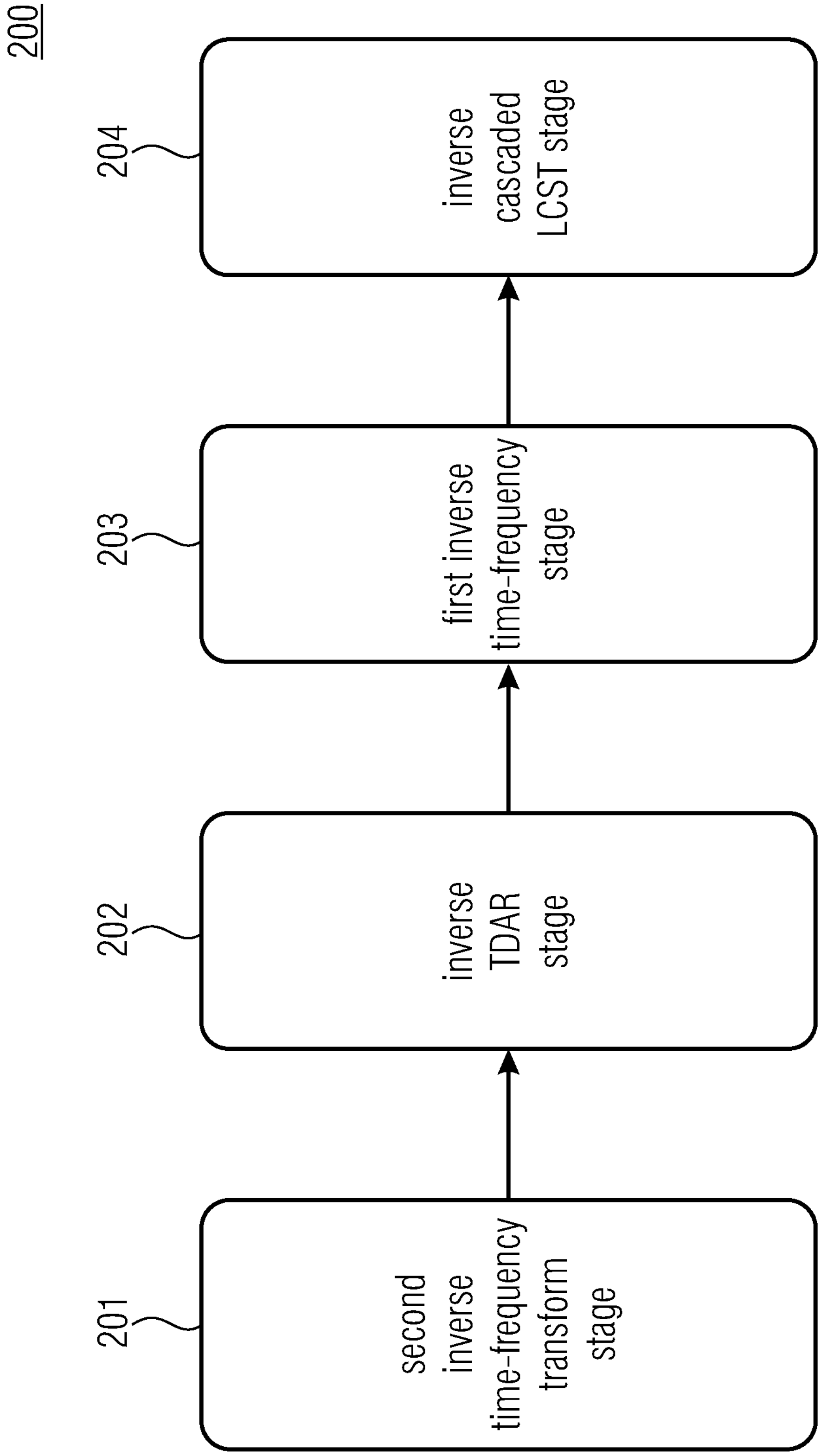
FIG. 18 shows a schematic block diagram of an audio processor for processing a subband representation of an audio signal to obtain the audio signal, according to a further embodiment.

FIG. 18 shows a schematic block diagram of an audio processor 200 for processing a subband representation of an audio signal to obtain the audio signal, according to a further embodiment.

The audio processor 200 comprises a second inverse time-frequency transform stage 201 that is inverse to the second time-frequency transform stage 107 of the audio processor 100 shown in FIG. 17. In detail, the second inverse time-frequency transform stage 201 can be configured to time-frequency transform one or more sets of aliasing reduced subband samples out of sets of aliasing reduced subband samples corresponding to a second block of samples of the audio signal and/or one or more sets of aliasing reduced subband samples out of sets of aliasing reduced subband samples corresponding to a second block of samples of the audio signal, to obtain one or more time-frequency transformed aliasing reduced subband samples, each of which represents the same region in the time-frequency plane that have the same length than a corresponding one of the one or more aliasing reduced subband samples corresponding to the other block of samples of the audio signal or one or more time-frequency transformed versions thereof.

Further, the audio processor 200 comprises an inverse time domain aliasing reduction (ITDAR) stage 202 configured to perform weighted combinations of corresponding sets of aliasing reduced subband samples or time-frequency transformed versions thereof, to obtain an aliased subband representation.

Further, the audio processor 200 comprises a first inverse time-frequency transform stage 203 configured to time-frequency transform the aliased subband representation, to obtain sets 110_1,1-110_1,2 of subband samples corresponding to the first block 108_1 of samples of the audio signal and sets 110_2,1-110_2,2 of subband samples corresponding to the second block 108_1 of samples of the audio signal, wherein a time-frequency transform applied by the first inverse time-frequency transform stage 203 is inverse to the time-frequency transform applied by the second inverse time-frequency transform stage 201.

Further, the audio processor 200 comprises a cascaded inverse lapped critically sampled transform stage 204 configured to perform a cascaded inverse lapped critically sampled transform on the sets of samples 110_1,1-110_2,2, to obtain a set 206_1,1 of samples associated with a block of samples of the audio signal 102.

Subsequently, embodiments of the present invention are described in further detail.

2.1 Time-Domain Aliasing Reduction

When expressing lapped transforms in polyphase notation, the frame-index can be expressed in z-Domain, where $z^{-1}$ references the previous frame [7]. In this notation MDCT analysis can be expressed as $$\vec{X}(z) = DF(z)\vec{x}(z) \tag{24}$$

where D is the N×N DCT-IV matrix, and F(z) is the N×N MDCT pre-permutation/folding matrix [7].

Subband merging M and TDAR R(z) then become another pair of blockdiagonal transform matrices $$M = \begin{bmatrix} T_0 & & \\ & \ddots & \\ & & T_K \end{bmatrix} \in \mathbb{R}^{N\times N} \tag{25}$$

$$R(z) = \begin{bmatrix} F'_0 & & \\ & \ddots & \\ & & F'_K \end{bmatrix}^{-1} (z) \in P(z)^{N\times N} \tag{26}$$

where $T_k$ is a suitable transform matrix (a lapped MDCT in some embodiments) and $F'(z)_k$ is a modified and smaller variant of F(z) [4]. The vector $\vec{v} \in \mathbb{N}^K$ containing the sizes of the submatrices $T_k$ and $F'(z)_k$ is called the subband layout. The overall analysis becomes $$\vec{Y}(z) = R(z)MDF(z)\vec{x}(z). \tag{27}$$

For sake of simplicity, only the special case of uniform tilings is analyzed in M and R(z) here, i.e. $\vec{v}=[c, \ldots, c]$ where c∈{1,2,4,8,16,32}, it is easy to see that embodiments are not restricted to those.

2.2 Switched Time-Domain Aliasing Reduction

Since STDAR will be applied between two differently transformed frames, in embodiments the subband merging matrix M, the TDAR matrix R(z), and subband layout $\vec{v}$ are extended to a time-varying notation M(m), R(z,m), and $\vec{v}(m)$, where m is the frame index [8].

$$M(m) = \begin{bmatrix} T_0 & & \\ & \ddots & \\ & & T_K \end{bmatrix} (m) \tag{28}$$

$$R(z, m) = \begin{bmatrix} F'_0 & & \\ & \ddots & \\ & & F'_K \end{bmatrix}^{-1} (z, m) \tag{29}$$

Of course, STDAR can also be extended to time varying matrices F(z,m) and D(m) however that scenario will not be considered here.

If the tilings of two frames m and m−1 are different, i.e.

$$\begin{gathered} \vec{v}(m-1) \neq \vec{v}(m) \\ M(m-1) \neq M(m) \\ R(z, m-1) \neq R(z, m) \end{gathered} \tag{30}$$

an additional transform matrix S(m) can be designed that temporarily transforms the time-frequency tiling of frame m to match the tiling of frame m−1 (backward-matching). An overview over the STDAR operation can be seen in FIG. 19.

Figure 19:
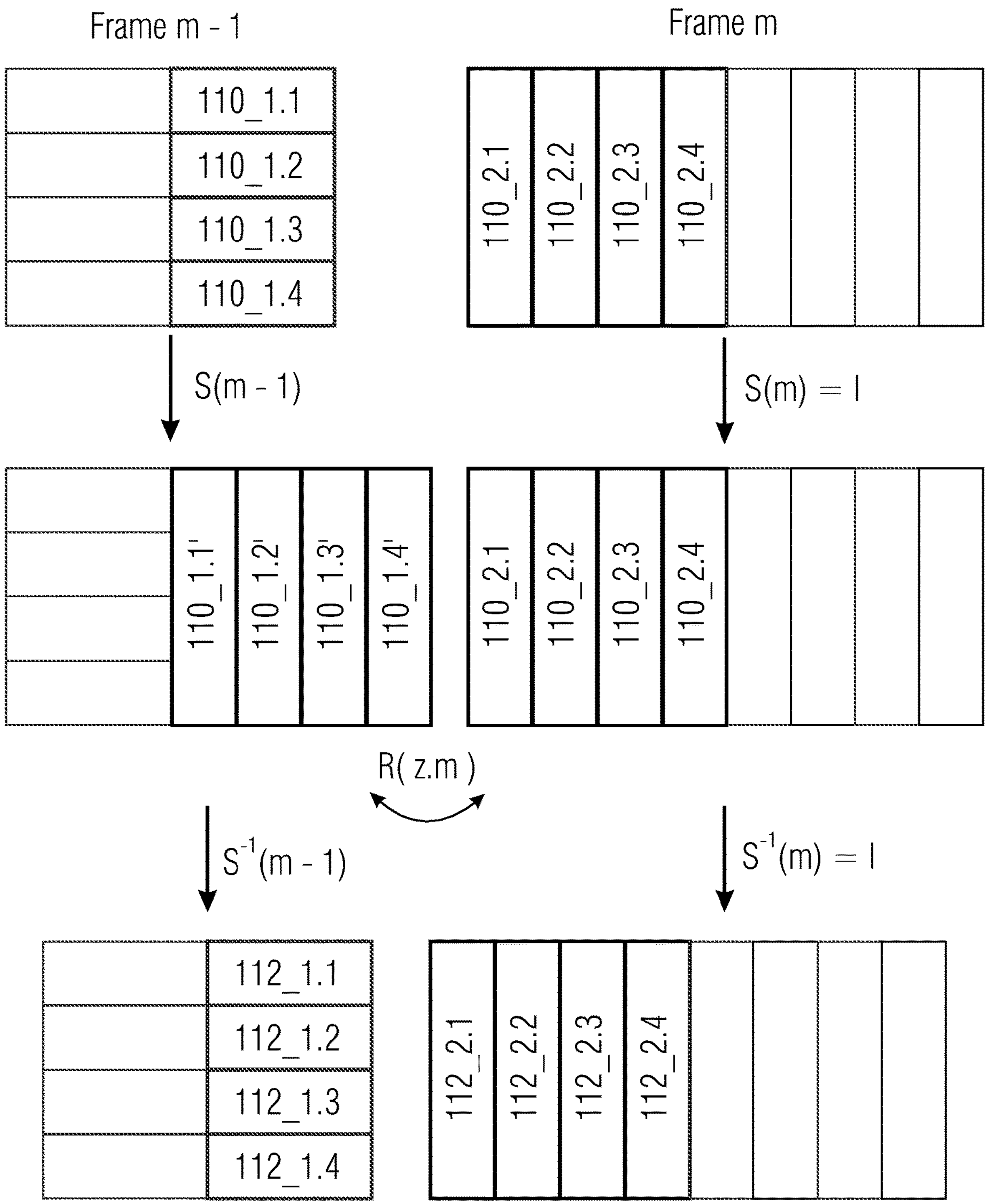
FIG. 19 shows a schematic representation of the STDAR operation in the time-frequency plane.

In detail, FIG. 19 shows a schematic representation of the STDAR operation in the time-frequency plane. As indicated in FIG. 19, sets 110_1,1-110_1,4 of subband samples corresponding the first block 108_1 of samples (frame m−1) and sets 110_2,1-110_2,4 of subband samples corresponding to the second block 108_2 of samples (frame m) represent different regions in the time-frequency plane. Thus, the sets of subband samples 110_1,1-110_1,4 corresponding the first block 108_1 of samples (frame m−1) can be time-frequency transformed, to obtain time-frequency transformed sets 110_1,1'-110_1,4' of subband samples corresponding to the first block 108_1 of samples (frame m−1), each of which represents the same region in the time-frequency plane than a corresponding one of the sets 110_2,1-110_2,4 of subband samples corresponding to the second block 108_2 of samples (frame m), such that TDAR (R(z,m)) can be applied as indicated in FIG. 19. Afterwards, an inverse time-frequency transform can be applied, to obtain aliasing reduced sets 112_1,1-112_1,4 of subband samples corresponding the first block 108_1 of samples (frame m−1) and aliasing reduced sets 112_2,1-112_2,4 of subband samples corresponding the second block 108_2 of samples (frame m).

In other words, FIG. 19 shows STDAR using forward-up-matching. Time-frequency tiling of the relevant half of frame m−1 is changed to match that of frame m, after which TDAR can be applied, and original tiling is reconstructed. The tiling of frame m is not changed as indicated by the identity matrix I.

Naturally, also frame m−1 can be transformed to match the time-frequency tiling of frame m (forward-matching). In that case, S(m−1) is considered instead of S(m). Both forward- and backward-matching are symmetric, so only one of the two operations is investigated.

If by this operation the time-resolution is increased by a subband merging step, herein it is referred to as up-matching. If the time-resolution is decreased by a subband splitting step, herein it is referred to as down-matching. Both, up- and down-matching are evaluated herein.

This matrix S(m) is again blockdiagonal, however with $\kappa \neq K$ $$S(m) = \begin{bmatrix} T_0 & & \\ & \ddots & \\ & & T_K \end{bmatrix}(m) \tag{31}$$

and will be applied before TDAR, and inverted afterwards. Thus, the analysis becomes $$\vec{Y}(z) = S^{-1}(m)R(z, m)S(m)M(m)DF(z)\vec{x}(z). \tag{32}$$

Naturally, only one half of each frame is affected by TDAR between two frames, so only one half of the corresponding frame needs to be transformed. As a result, half of S(m) can be chosen to be an identity matrix.

2.3 Additional Considerations

Obviously, the impulse response order (i.e. the row order) of each transform matrix is needed to match the order of its neighboring matrices.

In case of traditional TDAR, no special considerations needed to be taken, as the order of two adjacent identical frames was equal. However, depending on the choice of parameters, when introducing STDAR, the input ordering of STDAR S(m) may not be compatible with the output ordering of subband merging M. In this case two or more coefficients not adjacent in memory are jointly transformed and thus need to be re-aligning before the operation.

Also, the output ordering of STDAR S(m) usually is not compatible with the input ordering of the original definition of TDAR R(z,m). Again, the reason is because of coefficients of one subband not being adjacent in memory.

Both reordering and un-ordering can be expressed as additional Permutation matrices P and $P^{-1}$, which are introduced into the transform pipeline in the appropriate places.

The order of coefficients in these matrices depends on the operation, memory layout, and transforms used. Thus, a general solution cannot be provided here.

All matrices introduced are orthogonal, so the overall transform is still orthogonal.

2.4 Evaluation

In the evaluation, DCT-IV and DCT-II are considered for T(m) in S(m), which are both used without overlap. An input framelength of N=1024 is exemplarily chosen. Thereby, the system is analyzed for different switch ratios r(m), which is the merge factor ratio between two frames, i.e.

$$r(m) = \frac{c(m)}{c(m-1)} \tag{33}$$

Akin to when analyzing TDAR, the investigation is concentrated on the shape and especially on the compactness of the impulse response and frequency response of the overall transform [4], [9].

2.5 Results

The DCT-II yields the best results, so that subsequently it is focused on that transform. Forward- and backward-matching are symmetric and yield identical results, so that forward-matching results are described only.

Figure 20:
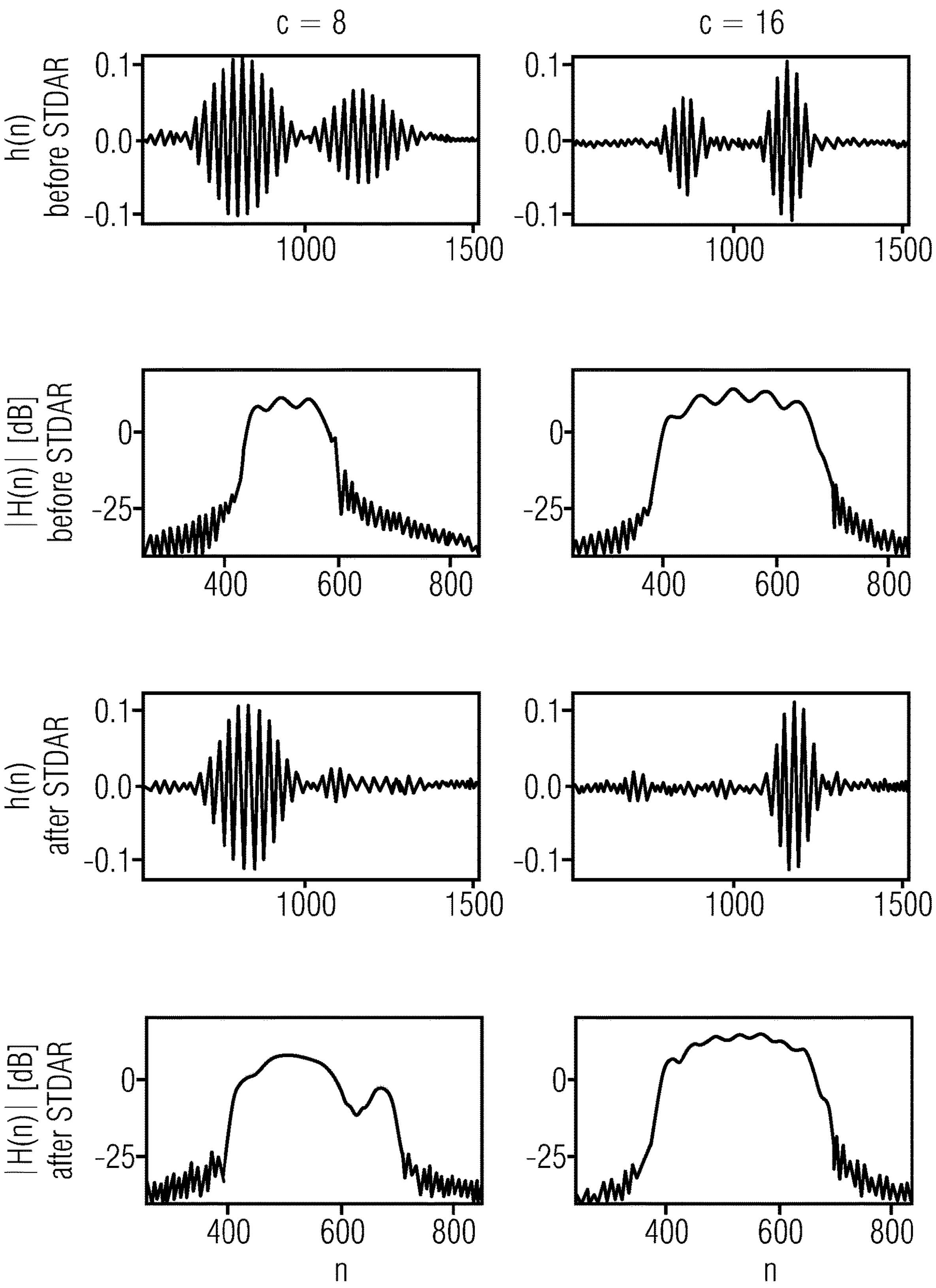
FIG. 20 shows in diagrams example impulse responses of two frames with merge factor 8 and 16 before STDAR (top) and after STDAR (bottom)

FIG. 20 shows in diagrams example impulse responses of two frames with merge factor 8 and 16 before STDAR (top) and after STDAR (bottom).

In other words, FIG. 20 shows two exemplary impulse responses of two frames with different time-frequency tilings, before and after STDAR. The impulse responses exhibit different widths because of their difference in merge factor—c(m−1)=8 and c(m)=16. After STDAR, aliasing is visibly reduced, but some residual aliasing is still visible.

Figure 21:
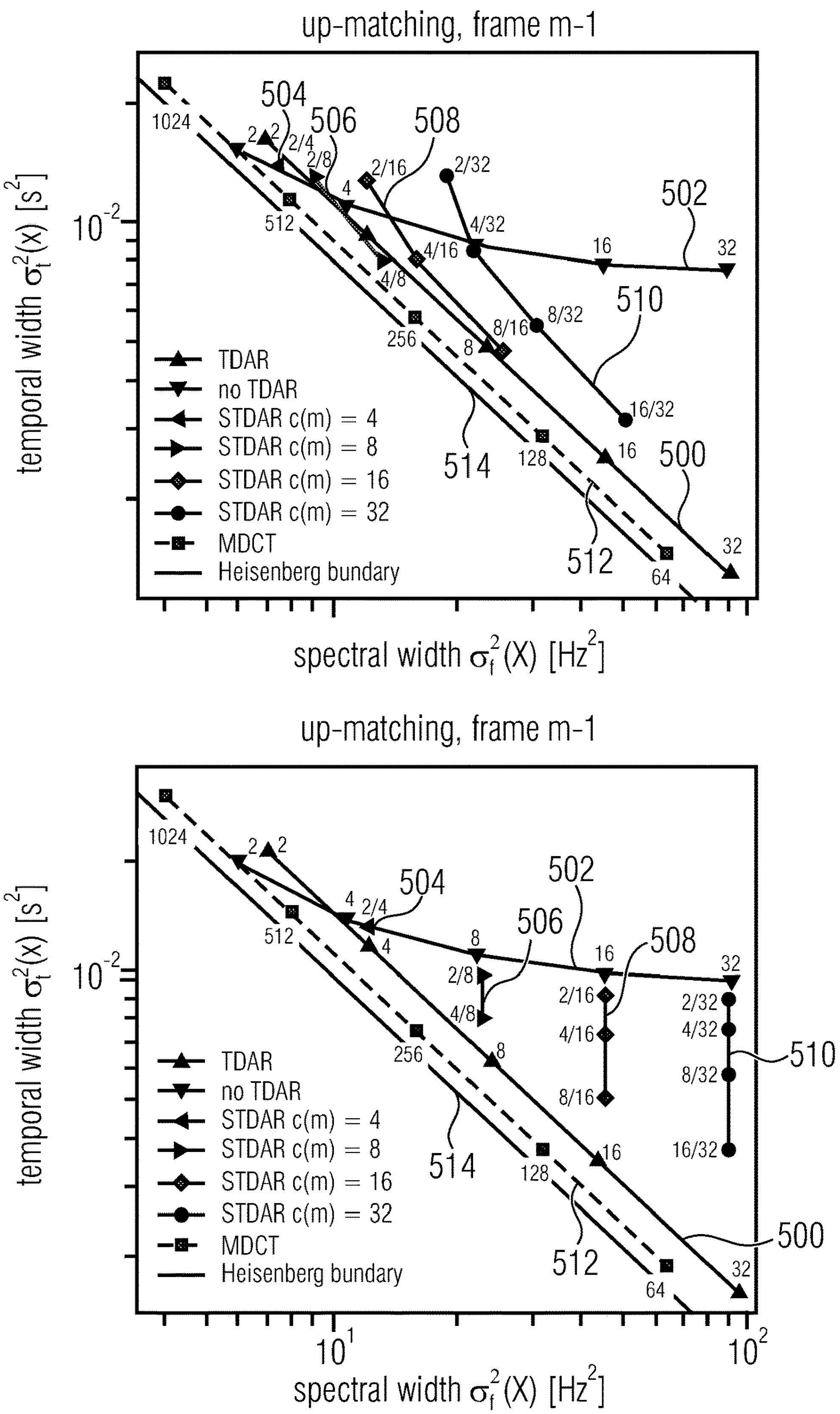
FIG. 21 shows in diagrams impulse response and frequency response compactness for up-matching.

FIG. 21 shows in a diagram impulse response and frequency response compactness for up-matching. Inline labels denote framelength for uniform MDCT, merge factors for TDAR, and merge factors of frame m−1 and m for STDAR. Thereby, in FIG. 21 a first curve 500 denotes TDAR, a second curve 502 denotes no TDAR, a third curve 504 denotes STDAR with c(m)=4, a fourth curve 506 denotes STDAR with c(m)=8, a fifth curve 508 denotes STDAR with c(m)=16, a sixth curve 510 denotes STDAR with c(m)=32, a seventh curve 512 denotes MDCT and an eight curve 514 denotes the Heisenberg boundary.

Figure 22:
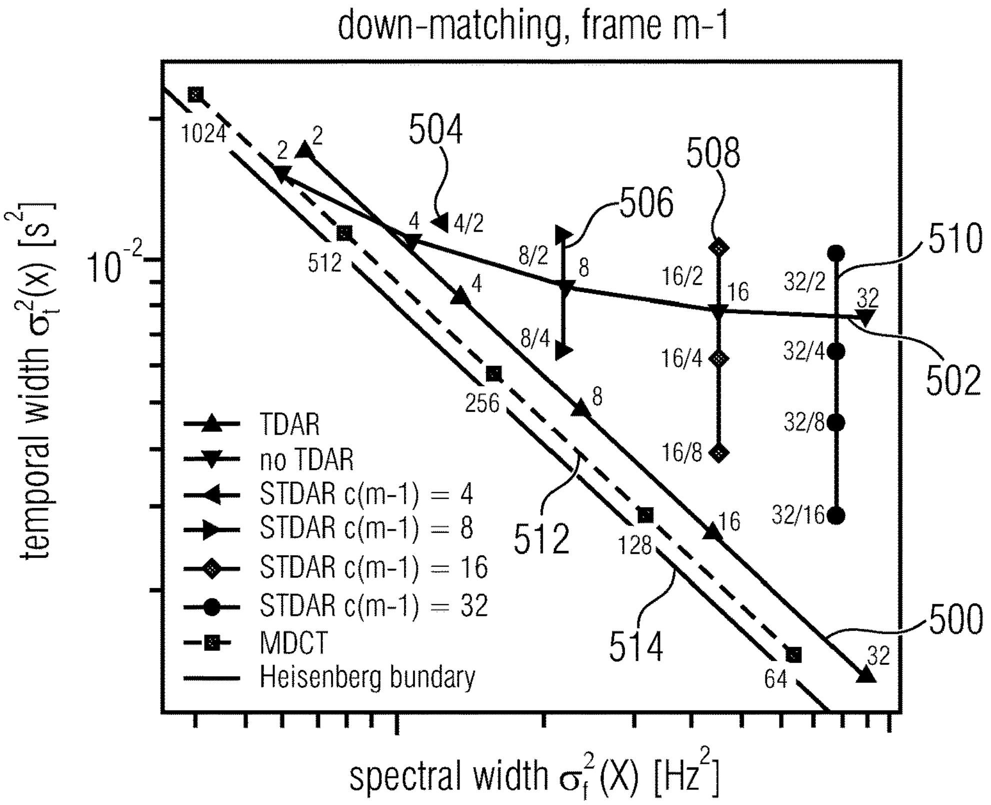
FIG. 22 shows in diagrams impulse response and frequency response compactness for down-matching.
Figure 22:
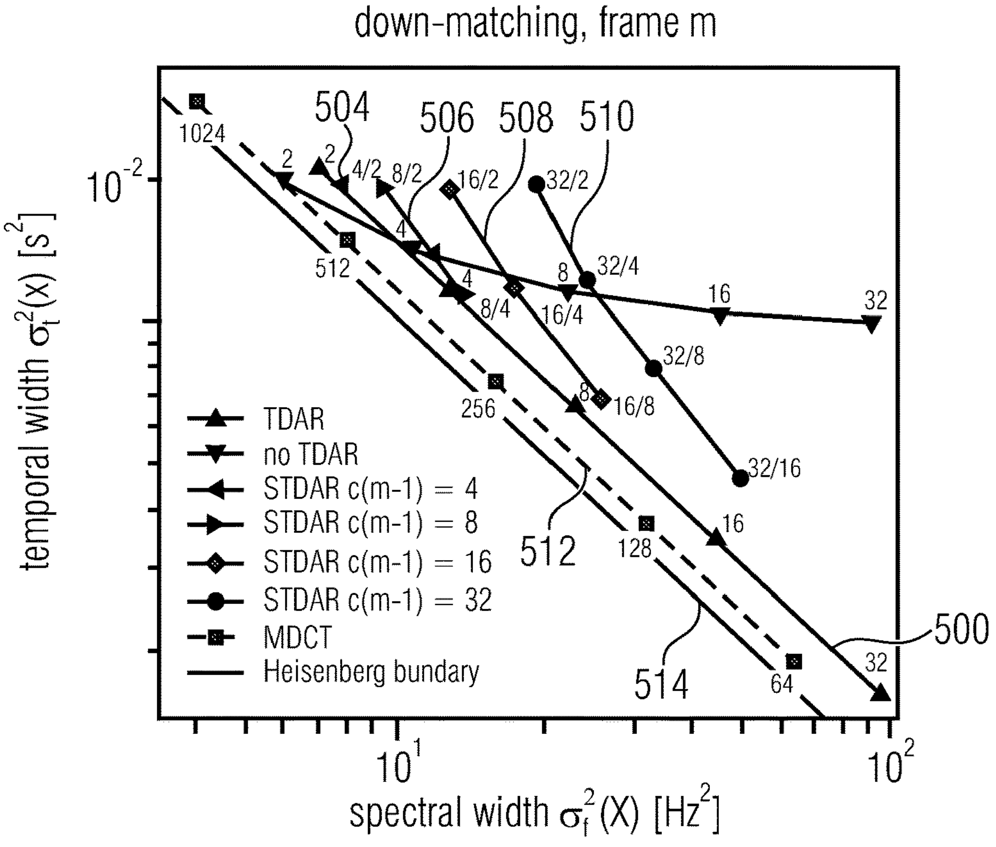

FIG. 22 shows in a diagram impulse response and frequency response compactness for down-matching. Inline labels denote framelength for uniform MDCT, merge factors for TDAR, and merge factors of frame m−1 and m for STDAR. Thereby, in FIG. 21 a first curve 500 denotes TDAR, a second curve 502 denotes no TDAR, a third curve 504 denotes STDAR with c(m)=4, a fourth curve 506 denotes STDAR with c(m)=8, a fifth curve 508 denotes STDAR with c(m)=16, a sixth curve 510 denotes STDAR with c(m)=32, a seventh curve 512 denotes MDCT and an eight curve 514 denotes the Heisenberg boundary.

Thereby, in FIGS. 21 and 22 the average impulse response compactness $\sigma_t^2$ and frequency response compactness $\sigma_f^2$ [3],[9] of a wide variety of filterbanks for up- and down-matching, respectively. For baseline comparison, a uniform MDCT, as well as subband merging with and without TDAR are shown [3], [4] using curves 512, 500 and 502. STDAR filterbanks are shown using curves 504, 506, 508 and 510. Each line represents all filterbanks with the same merge factor c. Inline labels for each datapoint denote the merge-factors of frame m−1 and m.

In FIG. 21, frame m−1 is transformed to match the tiling of Frame m. It can be seen that the temporal compactness of Frame m improves with no cost in spectral compactness. For the compactness of frame m−1 it can be seen an improvement for all merge factors c>2, but a regression for merge factor c=2. This regression was expected, as original TDAR with c=2 already resulted in worsened impulse response compactness [4].

A similar situation can be seen in FIG. 22. Again, frame m−1 is transformed to match the tiling of frame m. In this situation the temporal compactness of frame m−1 improves at no cost in spectral compactness. And again, merge factor c=2 remains problematic.

Overall, it can be clearly seen that for merge factors c>2, STDAR reduces the impulse response width by reducing aliasing. Across all merge factors, the compactness is best for smallest switch factors r.

2.6 Further Embodiments

Although the above embodiments primarily referred to unilateral STDAR, in which the STDAR operation changes the time-frequency tiling of only one of the two frames to match the other, it is noted that the present invention is not limited to such embodiments. Rather, in embodiments also bilateral STDAR can be applied, in which the STDAR operation changes the time-frequency tilings of both frames to eventually match each other. Such a system could be used to improve the system compactness for very high switch ratios, i.e. where instead of changing one frame from one extreme tiling to the other extreme tiling (32/2→2/2), both frames can be changed to a middle ground tiling 32/2→8/8.

Also, as long as orthogonality is not violated, numerical optimization of the coefficients in R(z,m) and S(m) is possible. This could improve the performance of STDAR for lower merge factors c or higher switch ratios r.

Time domain aliasing reduction (TDAR) is a method to improve impulse response compactness of non-uniform orthogonal Modified Discrete Cosine Transforms (MDCT). Conventionally, TDAR was only possible between frames of identical time-frequency tilings, however embodiments described herein overcome this limitation. Embodiments enable the use of TDAR between two consecutive frames of different time-frequency tilings by introducing another subband merging or subband splitting step. Consecutively, embodiments allow more flexible and adaptive filterbank tilings while still retaining compact impulse responses, two attributes needed for efficient perceptual audio coding.

Embodiments provide a method of applying time domain aliasing reduction (TDAR) between two frames of different time-frequency tilings. Prior, TDAR between such frames was not possible, which resulted in less ideal impulse response compactness when time-frequency tilings had to be adaptively changed.

Embodiments introducing another subband merging/subband splitting step, in order to allow for matching the time-frequency tilings of the two frames before applying TDAR. After TDAR, the original time-frequency tilings can be reconstructed.

Embodiments provide two scenarios. First, upward-matching in which the time resolution of one is increased to match the time resolution of the other. Second, downward-matching, the reverse case.

Figure 23:
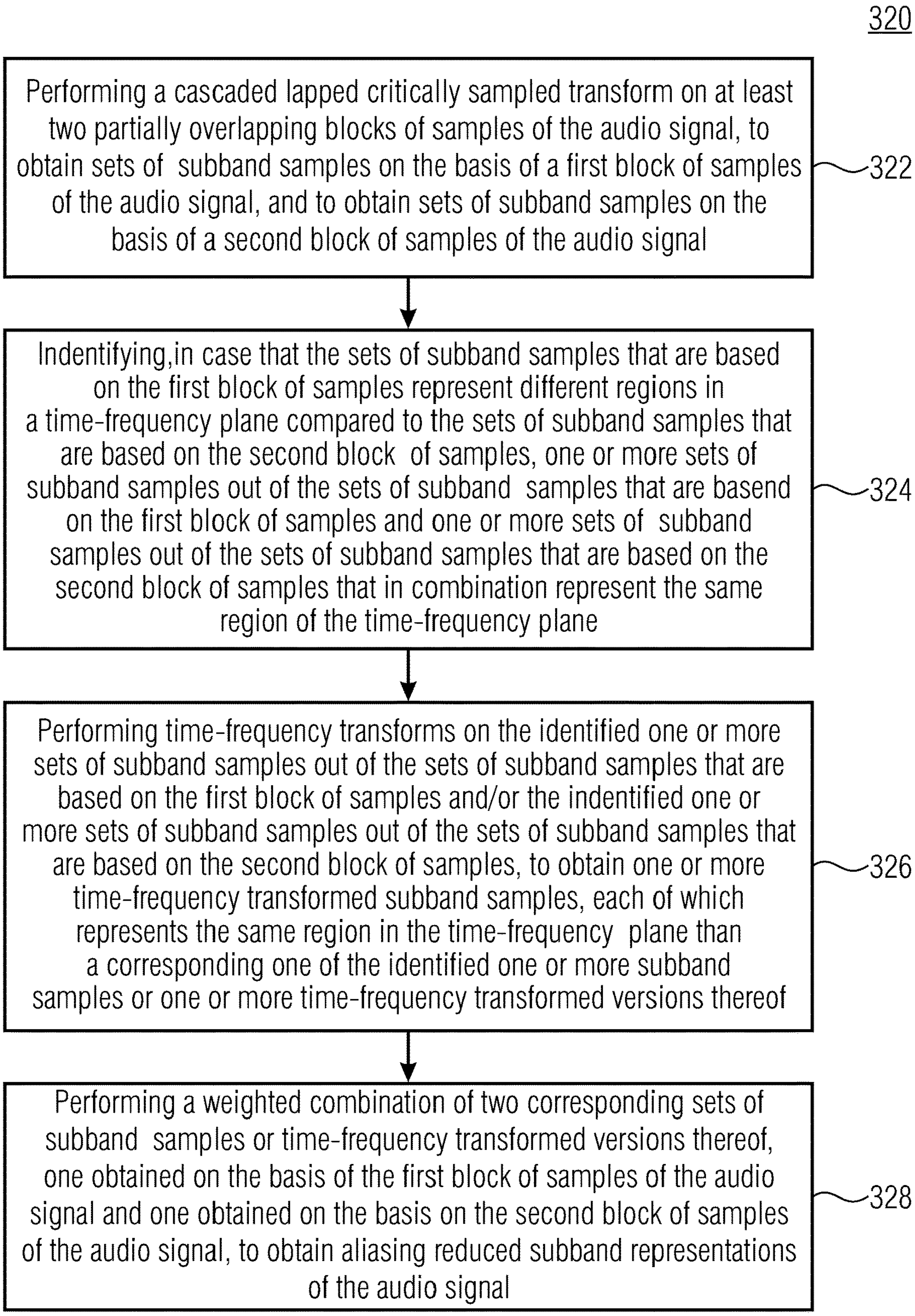
FIG. 23 shows a flowchart of a method for processing an audio signal to obtain a subband representation of the audio signal, according to a further embodiment.

FIG. 23 shows a flowchart of a method 320 for processing an audio signal to obtain a subband representation of the audio signal. The method comprises a step 322 of performing a cascaded lapped critically sampled transform on at least two partially overlapping blocks of samples of the audio signal, to obtain sets of subband samples on the basis of a first block of samples of the audio signal, and to obtain sets of subband samples on the basis of a second block of samples of the audio signal. Further, the method 320 comprises a step 324 of identifying, in case that the sets of subband samples that are based on the first block of samples represent different regions in a time-frequency plane compared to the sets of subband samples that are based on the second block of samples, one or more sets of subband samples out of the sets of subband samples that are based on the first block of samples and one or more sets of subband samples out of the sets of subband samples that are based on the second block of samples that in combination represent the same region of the time-frequency plane. Further, the method 320 comprises a step 326 of performing time-frequency transforms on the identified one or more sets of subband samples out of the sets of subband samples that are based on the first block of samples and/or the identified one or more sets of subband samples out of the sets of subband samples that are based on the second block of samples, to obtain one or more time-frequency transformed subband samples, each of which represents the same region in the time-frequency plane than a corresponding one of the identified one or more subband samples or one or more time-frequency transformed versions thereof. Further, the method 320 comprises a step 328 of performing a weighted combination of two corresponding sets of subband samples or time-frequency transformed versions thereof, one obtained on the basis of the first block of samples of the audio signal and one obtained on the basis of the second block of samples of the audio signal, to obtain aliasing reduced subband representations of the audio signal.

Figure 24:
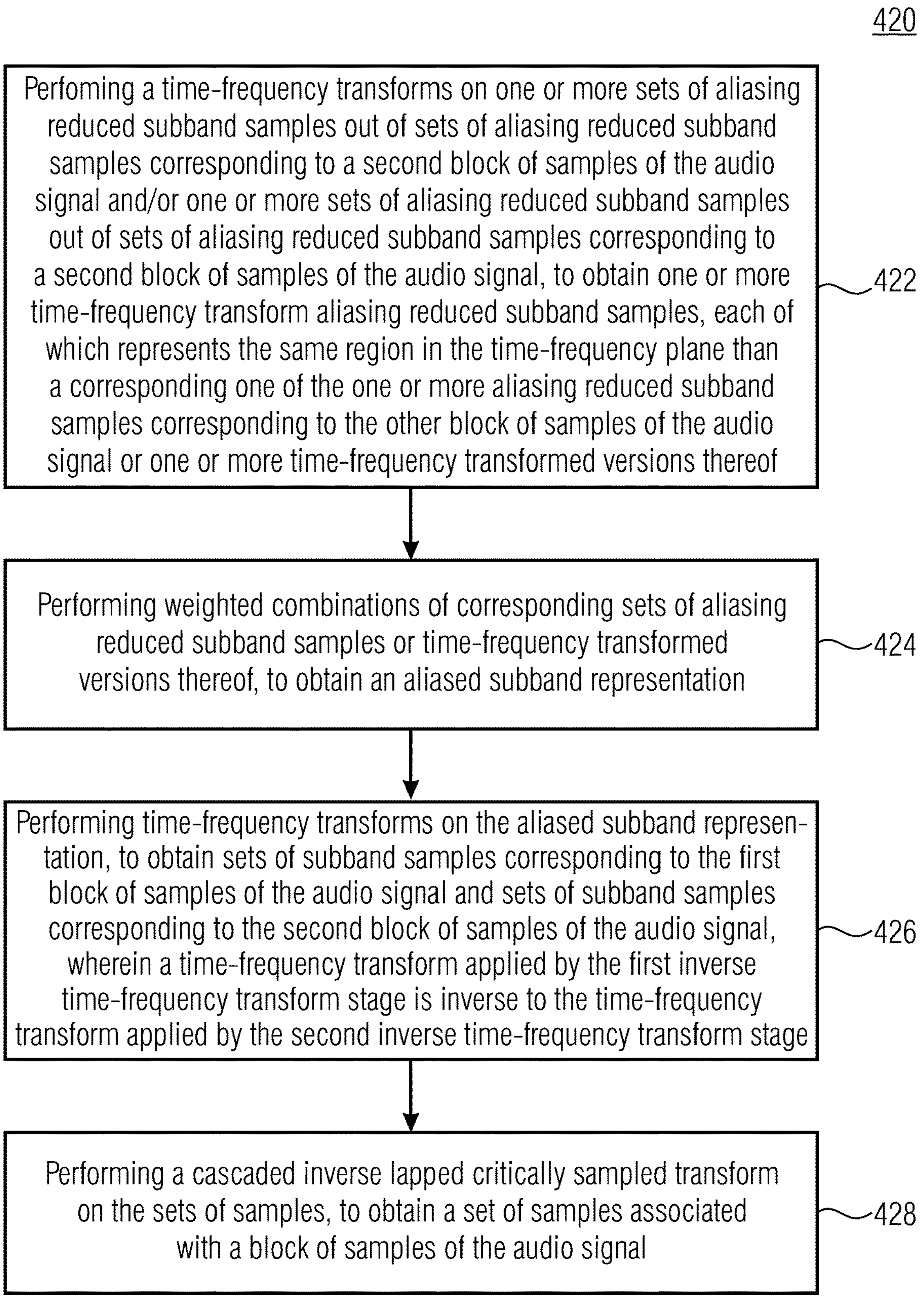
FIG. 24 shows a flowchart of a method for processing a subband representation of an audio signal to obtain the audio signal, the subband representation of the audio signal comprising aliasing reduced sets of samples, according to a further embodiment.

FIG. 24 shows a flowchart of a method 420 for processing a subband representation of an audio signal to obtain the audio signal, the subband representation of the audio signal comprising aliasing reduced sets of samples. The method 420 comprises a step 422 of performing a time-frequency transforms on one or more sets of aliasing reduced subband samples out of sets of aliasing reduced subband samples corresponding to a second block of samples of the audio signal and/or one or more sets of aliasing reduced subband samples out of sets of aliasing reduced subband samples corresponding to a second block of samples of the audio signal, to obtain one or more time-frequency transformed aliasing reduced subband samples, each of which represents the same region in the time-frequency plane than a corresponding one of the one or more aliasing reduced subband samples corresponding to the other block of samples of the audio signal or one or more time-frequency transformed versions thereof. Further, thee method 420 comprises a step 424 of performing weighted combinations of corresponding sets of aliasing reduced subband samples or time-frequency transformed versions thereof, to obtain an aliased subband representation. Further, the method 420 comprises a step 426 of performing time-frequency transforms on the aliased subband representation, to obtain sets of subband samples corresponding to the first block of samples of the audio signal and sets of subband samples corresponding to the second block of samples of the audio signal, wherein a time-frequency transform applied by the first inverse time-frequency transform stage is inverse to the time-frequency transform applied by the second inverse time-frequency transform stage. Further, thee method 420 comprises a step 428 of performing a cascaded inverse lapped critically sampled transform on the sets of samples, to obtain a set of samples associated with a block of samples of the audio signal.

Subsequently, further embodiments are described. Thereby, the below embodiments can be combined with the above embodiments.

Embodiment 1: An audio processor (100) for processing an audio signal (102) to obtain a subband representation of the audio signal (102), the audio processor (100) comprising: a cascaded lapped critically sampled transform stage (104) configured to perform a cascaded lapped critically sampled transform on at least two partially overlapping blocks (108_1; 108_2) of samples of the audio signal (102), to obtain a set (110_1,1) of subband samples on the basis of a first block (108_1) of samples of the audio signal (102), and to obtain a corresponding set (110_2,1) of subband samples on the basis of a second block (108_2) of samples of the audio signal (102); and a time domain aliasing reduction stage (106) configured to perform a weighted combination of two corresponding sets (110_1,1; 110_1,2) of subband samples, one obtained on the basis of the first block (108_1) of samples of the audio signal (102) and one obtained on the basis on the second block (108_2) of samples of the audio signal, to obtain an aliasing reduced subband representation (112_1) of the audio signal (102).

Embodiment 2: The audio processor (100) according to embodiment 1, wherein the cascaded lapped critically sampled transform stage (104) comprises: a first lapped critically sampled transform stage (120) configured to perform lapped critically sampled transforms on a first block (108_1) of samples and a second block (108_2) of samples of the at least two partially overlapping blocks (108_1; 108_2) of samples of the audio signal (102), to obtain a first set (124_1) of bins for the first block (108_1) of samples and a second set (124_2) of bins for the second block (108_2) of samples.

Embodiment 3: The audio processor (100) according to embodiment 2, wherein the cascaded lapped critically sampled transform stage (104) further comprises: a second lapped critically sampled transform stage (126) configured to perform a lapped critically sampled transform on a segment (128_1,1) of the first set (124_1) of bins and to perform a lapped critically sampled transform on a segment (128_2,1) of the second set (124_2) of bins, each segment being associated with a subband of the audio signal (102), to obtain a set (110_1,1) of subband samples for the first set of bins and a set (110_2,1) of subband samples for the second set of bins.

Embodiment 4: The audio processor (100) according to embodiment 3, wherein a first set (110_1,1) of subband samples is a result of a first lapped critically sampled transform (132_1,1) on the basis of the first segment (128_1, 1) of the first set (124_1) of bins, wherein a second set (110_1,2) of subband samples is a result of a second lapped critically sampled transform (132_1,2) on the basis of the second segment (128_1,2) of the first set (124_1) of bins, wherein a third set (110_2,1) of subband samples is a result of a third lapped critically sampled transform (132_2,1) on the basis of the first segment (128_2,1) of the second set (128_2,1) of bins, wherein a fourth set (110_2,2) of subband samples is a result of a fourth lapped critically sampled transform (132_2,2) on the basis of the second segment (128_2,2) of the second set (128_2,1) of bins; and wherein the time domain aliasing reduction stage (106) is configured to perform a weighted combination of the first set (110_1,1) of subband samples and the third set (110_2,1) of subband samples, to obtain a first aliasing reduced subband representation (112_1) of the audio signal, wherein the time domain aliasing reduction stage (106) is configured to perform a weighted combination of the second set (110_1,2) of subband samples and the fourth set (110_2,2) of subband samples, to obtain a second aliasing reduced subband representation (112_2) of the audio signal.

Embodiment 5: The audio processor (100) according to one of the embodiments 1 to 4, wherein the cascaded lapped critically sampled transform stage (104) is configured to segment a set (124_1) of bins obtained on the basis of the first block (108_1) of samples using at least two window functions, and to obtain at least two segmented sets (128_1, 1; 128_1,2) of subband samples based on the segmented set of bins corresponding to the first block (108_1) of samples; wherein the cascaded lapped critically sampled transform stage (104) is configured to segment a set (124_2) of bins obtained on the basis of the second block (108_2) of samples using the at least two window functions, and to obtain at least two segmented sets (128_2,1; 128_2,2) of subband samples based on the segmented set of bins corresponding to the second block (108_2) of samples; and wherein the at least two window functions comprise different window width.

Embodiment 6: The audio processor (100) according to one of the embodiments 1 to 5, wherein the cascaded lapped critically sampled transform stage (104) is configured to segment a set (124_1) of bins obtained on the basis of the first block (108_1) of samples using at least two window functions, and to obtain at least two segmented sets (128_1, 1; 128_1,2) of subband samples based on the segmented set of bins corresponding to the first block (108_1) of samples; wherein the cascaded lapped critically sampled transform stage (104) is configured to segment a set (124_2) of bins obtained on the basis of the second block (108_2) of samples using the at least two window functions, and to obtain at least two sets (128_2,1; 128_2,2) of subband samples based on the segmented set of bins corresponding to the second block (108_2) of samples; and wherein filter slopes of the window functions corresponding to adjacent sets of subband samples are symmetric.

Embodiment 7: The audio processor (100) according to one of the embodiments 1 to 6, wherein the cascaded lapped critically sampled transform stage (104) is configured to segment the samples of the audio signal into the first block (108_1) of samples and the second block (108_2) of samples using a first window function; wherein the lapped critically sampled transform stage (104) is configured to segment a set (124_1) of bins obtained on the basis of the first block (108_1) of samples and a set (124_2) of bins obtained on the basis of the second block (108_2) of samples using a second window function, to obtain the corresponding subband samples; and wherein the first window function and the second window function comprise different window width.

Embodiment 8: The audio processor (100) according to one of the embodiments 1 to 6, wherein the cascaded lapped critically sampled transform stage (104) is configured to segment the samples of the audio signal into the first block (108_1) of samples and the second block (108_2) of samples using a first window function; wherein the cascaded lapped critically sampled transform stage (104) is configured to segment a set (124_1) of bins obtained on the basis of the first block (108_1) of samples and a set (124_2) of bins obtained on the basis of the second block (108_2) of samples using a second window function, to obtain the corresponding subband samples; and wherein a window width of the first window function and a window width of the second window function are different from each other, wherein the window width of the first window function and the window width of the second window function differ from each other by a factor different from a power of two.

Embodiment 9: The audio processor (100) according to one of the embodiments 1 to 8, wherein the time domain aliasing reduction stage (106) is configured to perform the weighted combination of two corresponding sets of subband samples according to the following equation $$\begin{bmatrix} y_{v,i}(m) \\ y_{v,i-1}(N-1-m) \end{bmatrix} = A \begin{bmatrix} \hat{y}_{v,i}(m) \\ \hat{y}_{v,i-1}(N-1-m) \end{bmatrix}$$

$$\text{for } 0 \le m < N/2 \text{ with}$$

$$A = \begin{bmatrix} a_v(m) & b_v(m) \\ c_v(m) & d_v(m) \end{bmatrix}$$

to obtain the aliasing reduced subband representation of the audio signal, wherein $y_{v,i}(m)$ is a first aliasing reduced subband representation of the audio signal, $y_{v,i-1}(N-1-m)$ is a second aliasing reduced subband representation of the audio signal, $\hat{y}_{v,i}(m)$ is a set of subband samples on the basis of the second block of samples of the audio signal, $\hat{y}_{v,i-1}(N-1-m)$ is a set of subband samples on the basis of the first block of samples of the audio signal, $a_v(m)$ is . . . , $b_v(m)$ is . . . , $c_v(m)$ is . . . and $d_v(m)$ is . . . .

Embodiment 10: An audio processor (200) for processing a subband representation of an audio signal to obtain the audio signal (102), the audio processor (200) comprising: an inverse time domain aliasing reduction stage (202) configured to perform a weighted combination of two corresponding aliasing reduced subband representations of the audio signal (102), to obtain an aliased subband representation, wherein the aliased subband representation is a set (110_1,1) of subband samples; and a cascaded inverse lapped critically sampled transform stage (204) configured to perform a cascaded inverse lapped critically sampled transform on the set (110_1,1) of subband samples, to obtain a set (206_1,1) of samples associated with a block of samples of the audio signal (102).

Embodiment 11: The audio processor (200) according to embodiment 10, wherein the cascaded inverse lapped critically sampled transform stage (204) comprises a first inverse lapped critically sampled transform stage (208) configured to perform an inverse lapped critically sampled transform on the set (110_1,1) of subband samples, to obtain a set of bins (128_1,1) associated with a given subband of the audio signal; and a first overlap and add stage (210) configured to perform a concatenation of sets of bins associated with a plurality of subbands of the audio signal, which comprises a weighted combination of the set (128_1,1) of bins associated with the given subband of the audio signal (102) with a set (128_1,2) of bins associated with another subband of the audio signal (102), to obtain a set (124_1) of bins associated with a block of samples of the audio signal (102).

Embodiment 12: The audio processor (200) according to embodiment 11, wherein the cascaded inverse lapped critically sampled transform stage (204) comprises a second inverse lapped critically sampled transform stage (212) configured to perform an inverse lapped critically sampled transform on the set (124_1) of bins associated with the block of samples of the audio signal (102), to obtain a set of samples associated with the block of samples of the audio signal (102).

Embodiment 13: The audio processor (200) according to embodiment 12, wherein the cascaded inverse lapped critically sampled transform stage (204) comprises a second overlap and add stage (214) configured to overlap and add the set (206_1,1) of samples associated with the block of samples of the audio signal (102) and another set (206_2,1) of samples associated with another block of samples of the audio signal (102), the block of samples and the another block of samples of the audio signal (102) partially overlapping, to obtain the audio signal (102).

Embodiment 14: The audio processor (200) according to one of the embodiments 10 to 13, wherein the inverse time domain aliasing reduction stage (202) is configured to perform the weighted combination of the two corresponding aliasing reduced subband representations of the audio signal (102) based on the following equation $$\begin{bmatrix} \hat{y}_{v,i}(m) \\ \hat{y}_{v,i-1}(N-1-m) \end{bmatrix} = A^{-1} \begin{bmatrix} y_{v,i}(m) \\ y_{v,i-1}(N-1-m) \end{bmatrix}$$

$$\text{for } 0 \le m < N/2 \text{ with}$$

$$A = \begin{bmatrix} a_v(m) & b_v(m) \\ c_v(m) & d_v(m) \end{bmatrix}$$

to obtain the aliased subband representation, wherein $y_{v,i}(m)$ is a first aliasing reduced subband representation of the audio signal, $y_{v,i-1}(N-1-m)$ is a second aliasing reduced subband representation of the audio signal, $\hat{y}_{v,i}(m)$ is a set of subband samples on the basis of the second block of samples of the audio signal, $\hat{y}_{v,i-1}(N-1-m)$ is a set of subband samples on the basis of the first block of samples of the audio signal, $a_v(m)$ is . . . , $b_v(m)$ is . . . , $c_v(m)$ is . . . and $d_v(m)$ is . . . .

Embodiment 15: An audio encoder, comprising: an audio processor (100) according to one of the embodiments 1 to 9; an encoder configured to encode the aliasing reduced subband representation of the audio signal, to obtain an encoded aliasing reduced subband representation of the audio signal; and a bitstream former configured to form a bitstream from the encoded aliasing reduced subband representation of the audio signal.

Embodiment 16: An audio decoder, comprising: a bitstream parser configured to parse the bitstream, to obtain the encoded aliasing reduced subband representation; a decoder configured to decode the encoded aliasing reduced subband representation, to obtain the aliasing reduced subband representation of the audio signal; and an audio processor (200) according to one of the embodiments 10 to 14.

Embodiment 17. An audio analyzer, comprising: an audio processor (100) according to one of the embodiments 1 to 9;

and an information extractor, configured to analyze the aliasing reduced subband representation, to provide an information describing the audio signal.

Embodiment 18: A method (300) for processing an audio signal to obtain a subband representation of the audio signal, the method comprising: performing (302) a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing (304) a weighted combination of two corresponding sets of subband samples, one obtained on the basis of the first block of samples of the audio signal and one obtained on the basis on the second block of samples of the audio signal, to obtain an aliasing reduced subband representation of the audio signal.

Embodiment 19: A method (400) for processing a subband representation of an audio signal to obtain the audio signal, the method comprising: Performing (402) a weighted combination of two corresponding aliasing reduced subband representations of the audio signal, to obtain an aliased subband representation, wherein the aliased subband representation is a set of subband samples; and performing (404) a cascaded inverse lapped critically sampled transform on the set of subband samples, to obtain a set of samples associated with a block of samples of the audio signal.

Embodiment 20: A computer program for performing a method according to one of the embodiments 18 and 19.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] H. S. Malvar, "Biorthogonal and nonuniform lapped transforms for transform coding with reduced blocking and ringing artifacts," IEEE Transactions on Signal Processing, vol. 46, no. 4, pp. 1043-1053, April 1998.

[2] O. A. Niamut and R. Heusdens, "Subband merging in cosine-modulated filter banks," IEEE Signal Processing Letters, vol. 10, no. 4, pp. 111-114, April 2003.

[3] Frederic Bimbot, Ewen Camberlein, and Pierrick Philippe, "Adaptive Filter Banks using Fixed Size MDCT and Subband Merging for Audio Coding—Comparison with the MPEG AAC Filter Banks," in Audio Engineering Society Convention 121. October 2006, Audio Engineering Society.

[4] N. Werner and B. Edler, "Nonuniform Orthogonal Filterbanks Based on MDCT Analysis/Synthesis and Time-Domain Aliasing Reduction," IEEE Signal Processing Letters, vol. 24, no. 5, pp. 589-593, May 2017.

[5] Nils Werner and Bernd Edler, "Perceptual Audio Coding with Adaptive Non-Uniform Time/Frequency Tilings using Subband Merging and Time Domain Aliasing Reduction," in 2019 IEEE International Conference on Acoustics, Speech and Signal Processing, 2019.

[6] B. Edler, "Codierung von Audiosignalen mit überlappender Transformation and adaptiven Fensterfunktionen," Frequenz, vol. 43, pp. 252-256, September 1989.

[7] G. D. T. Schuller and M. J. T. Smith, "New framework for modulated perfect reconstruction filter banks," IEEE Transactions on Signal Processing, vol. 44, no. 8, pp. 1941-1954, August 1996.

[8] Gerald Schuller, "Time-Varying Filter Banks With Variable System Delay," in In IEEE International Conference on Acoustics, Speech, and Signal Processing (ICASSP, 1997, pp. 21-24.

[9] Carl Taswell, "Empirical Tests for Evaluation of Multirate Filter Bank Parameters," in Wavelets in Signal and Image Analysis, Max A. Viergever, Arthur A. Petrosian, and François G. Meyer, Eds., vol. 19, pp. 111-139. Springer Netherlands, Dordrecht, 2001.

[10] F. Schuh, S. Dick, R. Füg, C. R. Helmrich, N. Rettelbach, and T. Schwegler, "Efficient Multichannel Audio Transform Coding with Low Delay and Complexity." Audio Engineering Society, September 2016. [Online]. Available: http://www.aes.org/e-lib/browse.cfm?elib=18464

The invention claimed is:

1. An audio processor for processing an audio signal to acquire a subband representation of the audio signal, the audio processor comprising:

a cascaded lapped critically sampled transform stage configured to perform a cascaded lapped critically sampled transform on at least two partially overlapping blocks of samples of the audio signal, to acquire sets of subband samples on the basis of a first block of samples of the audio signal, and to acquire sets of subband samples on the basis of a second block of samples of the audio signal;

a first time-frequency transform stage configured to identify, in case that sets of subband samples that are based on the first block of samples represent different regions in a time-frequency plane compared to sets of subband samples that are based on the second block of samples, one or more first identified sets of subband samples out of the sets of subband samples that are based on the first block of samples and one or more second identified sets of subband samples out of the sets of subband samples that are based on the second block of samples that in combination represent the same region in the time-frequency plane, and to time-frequency transform the identified one or more first sets of subband samples out of the sets of subband samples that are based on the first block of samples and/or the identified one or more second sets of subband samples out of the sets of subband samples that are based on the second block of samples, to acquire one or more time-frequency transformed subband samples, each of which represents the same region in the time-frequency plane as a corresponding one of the one or more first or second identified sets of subband samples or one or more time-frequency transformed versions of the one or more first or second identified sets of subband samples; and a time domain aliasing reduction stage configured to perform a weighted combination of two corresponding sets of subband samples or time-frequency transformed versions of the two corresponding sets of subband samples, one acquired on the basis of the first block of samples of the audio signal and one acquired on the basis of the second block of samples of the audio signal, to acquire aliasing reduced subband representations of the audio signal.

2. The audio processor according to claim 1, wherein the time-frequency transform performed by the first time-frequency transform stage is a lapped critically sampled transform.

3. The audio processor according to claim 1, wherein the time-frequency transform of the identified one or more second sets of subband samples out of the sets of subband samples that are based on the second block of samples and/or of the identified one or more second sets of subband samples out of the sets of subband samples that are based on the second block of samples performed by the time-frequency transform stage corresponds to a transform described by the following formula $$S(m) = \begin{bmatrix} T_0 & & \\ & \ddots & \\ & & T_K \end{bmatrix} (m)$$

wherein S(m) describes the transform, wherein m describes the index of the block of samples of the audio signal, wherein $T_0 \ldots T_K$ describe the subband samples of the corresponding identified one or more sets of subband samples.

4. The audio processor according to claim 1, wherein the cascaded lapped critically sampled transform stage is configured to process a first set of bins acquired on the basis of the first block of samples of the audio signal and a second set of bins acquired on the basis of the second block of samples of the audio signal using a second lapped critically sampled transform stage of the cascaded lapped critically sampled transform stage, wherein the second lapped critically sampled transform stage is configured to perform, in dependence on signal characteristics of the audio signal, first lapped critically sampled transforms on the first set of bins to acquire the sets of subband samples that are based on the first block of samples and second lapped critically sampled transforms on the second set of bins to acquire the sets of subband samples that are based on the second block of samples, one or more of the first critically sampled transforms having different lengths when compared to the second critically sampled transforms.

5. The audio processor according to claim 4, wherein the first time-frequency transform stage is configured to identify, in case that one or more of the first critically sampled transforms have different lengths when compared to the second critically sampled transforms, one or more sets of subband samples out of the sets of subband samples that are based on the first block of samples and one or more sets of subband samples out of the sets of subband samples that are based on the second block of samples that represent the same region in the time-frequency plane of the audio signal.

6. The audio processor according to claim 1, wherein the audio processor comprises a second time-frequency transform stage configured to time-frequency transform the aliasing reduced subband representation of the audio signal, wherein a time-frequency transform applied by the second time-frequency transform stage is inverse to the time-frequency transform applied by the first time-frequency transform stage.

7. The audio processor according to claim 1, wherein the time-domain aliasing reduction performed by the time-domain aliasing reduction stage corresponds to a transform described by the following formula $$R(z,m) = \begin{bmatrix} F'_0 & & \\ & \ddots & \\ & & F'_K \end{bmatrix}^{-1} (z,m)$$

wherein R(z,m) describes the transform, wherein z describes a frame-index in z-domain, wherein m describes the index of the block of samples of the audio signal, wherein $F'_0 \ldots F'_K$ describe modified versions of N×N lapped critically sampled transform pre-permutation/folding matrices.

8. The audio processor according to claim 1, wherein the audio processor is configured to provide a bitstream comprising a Switched Time Domain Aliasing Reduction (STDAR) parameter indicating whether a length of the identified one or more sets of subband samples corresponding to the first block of samples or to the second block of samples is used in the time-domain aliasing reduction stage for acquiring the corresponding aliasing reduced subband representation of the audio signal, or wherein the audio processor is configured to provide a bitstream comprising modified discrete cosine transform (MDCT) length parameters indicating lengths of the sets of subband samples.

9. The audio processor according to claim 1, wherein the audio processor is configured to perform joint channel coding.

10. The audio processor according to claim 9, wherein the audio processor is configured to perform mid-side (M/S) or multi-channel coding tool (MCT) as joint channel processing.

11. The audio processor according to claim 1, wherein the audio processor is configured to provide a bitstream comprising at least one Switched Time Domain Aliasing Reduction (STDAR) parameter indicating a length of the one or more time-frequency transformed subband samples corresponding to the first block of samples and of the one or more time-frequency transformed subband samples corresponding to the second block of samples used in the time-domain aliasing reduction stage for acquiring the corresponding aliasing reduced subband representation of the audio signal or an encoded version thereof.

12. The audio processor according to claim 1, wherein the cascaded lapped critically sampled transform stage comprises a first lapped critically sampled transform stage configured to perform lapped critically sampled transforms on a first block of samples and a second block of samples of the at least two partially overlapping blocks of samples of the audio signal, to acquire a first set of bins for the first block of samples and a second set of bins for the second block of samples.

13. The audio processor according to claim 12, wherein the cascaded lapped critically sampled transform stage further comprises a second lapped critically sampled transform stage configured to perform a lapped critically sampled transform on a segment of the first set of bins and to perform a lapped critically sampled transform on a segment of the second set of bins, each segment being associated with a subband of the audio signal, to acquire a set of subband samples for the first set of bins and a set of subband samples for the second set of bins.

14. An audio processor for processing a subband representation of an audio signal to acquire the audio signal, the subband representation of the audio signal comprising sets of aliasing reduced subband samples, the audio processor comprising:

a second inverse time-frequency transform stage configured to perform a second time- frequency transform on one or more sets of aliasing reduced subband samples out of sets of aliasing reduced subband samples corresponding to a first block of samples of the audio signal and/or one or more sets of aliasing reduced subband samples out of sets of aliasing reduced subband samples corresponding to a second block of samples of the audio signal, to acquire one or more time-frequency transformed aliasing reduced subband samples, each of which represents the same region in the time-frequency plane as a corresponding one of the one or more sets of aliasing reduced subband samples or one or more time-frequency transformed versions of the one or more sets of aliasing reduced subband samples, an inverse time domain aliasing reduction stage configured to perform weighted combinations of corresponding sets of aliasing reduced subband samples or time-frequency transformed versions thereof, to acquire an aliased subband representation, a first inverse time-frequency transform stage configured to apply a first time-frequency transform on the aliased subband representation, to acquire sets of subband samples corresponding to the first block of samples of the audio signal and sets of subband samples corresponding to the second block of samples of the audio signal, wherein the first time-frequency transform applied by the first inverse time-frequency transform stage is inverse to the second time-frequency transform applied by the second inverse time-frequency transform stage, and a cascaded inverse lapped critically sampled transform stage configured to perform a cascaded inverse lapped critically sampled transform on the sets of subband samples corresponding to the first block of samples of the audio signal and sets of subband samples corresponding to the second block of samples of the audio signal, to acquire a set of samples associated with the first block of samples of the audio signal or the second block of samples of the audio signal.

15. A method for processing an audio signal to acquire a subband representation of the audio signal, the method comprising:

performing a cascaded lapped critically sampled transform on at least two partially overlapping blocks of samples of the audio signal, to acquire sets of subband samples on the basis of a first block of samples of the audio signal, and to acquire sets of subband samples on the basis of a second block of samples of the audio signal;

identifying, in case that sets of subband samples that are based on the first block of samples represent different regions in a time-frequency plane compared to sets of subband samples that are based on the second block of samples, one or more first identified sets of subband samples out of the sets of subband samples that are based on the first block of samples and one or more second identified sets of subband samples out of the sets of subband samples that are based on the second block of samples that in combination represent the same region of the time-frequency plane, performing time-frequency transforms on the identified one or more first sets of subband samples out of the sets of subband samples that are based on the first block of samples and/or the identified one or more second sets of subband samples out of the sets of subband samples that are based on the second block of samples, to acquire one or more time-frequency transformed subband samples, each of which represents the same region in the time-frequency plane as a corresponding one of the one or more first or second identified sets of subband samples or one or more time-frequency transformed versions of the one or more first or second identified sets of subband samples; and performing a weighted combination of two corresponding sets of subband samples or time-frequency transformed versions of two corresponding sets of subband samples, one acquired on the basis of the first block of samples of the audio signal and one acquired on the basis of the secondblock of samples of the audio signal, to acquire aliasing reduced subband representations of the audio signal.

16. A method for processing a subband representation of an audio signal to acquire the audio signal, the subband representation of the audio signal comprising sets of aliasing reduced subband samples, the method comprising:

performing a second time-frequency transform on one or more sets of aliasing reduced subband samples out of sets of aliasing reduced subband samples corresponding to a first block of samples of the audio signal and/or one or more sets of aliasing reduced subband samples out of sets of aliasing reduced subband samples corresponding to a second block of samples of the audio signal, to acquire one or more time-frequency transformed aliasing reduced subband samples, each of which represents the same region in the time-frequency plane as a corresponding one of the one or more sets of aliasing reduced subband samples or one or more time-frequency transformed versions of the one or more sets of aliasing reduced subband samples, performing weighted combinations of corresponding sets of aliasing reduced subband samples or time-frequency transformed versions thereof, to acquire an aliased subband representation, performing a first time-frequency transform on the aliased subband representation, to acquire sets of subband samples corresponding to the first block of samples of the audio signal and sets of subband samples corresponding to the second block of samples of the audio signal, wherein the first time-frequency transform-performed on the one or more sets of aliasing reduced subband samples out of sets of aliasing reduced subband samples corresponding to the first block of samples of the audio signal or the one or more sets of aliasing reduced subband samples out of sets of aliasing reduced subband samples corresponding to the second block of samples of the audio signal is inverse to the second time-frequency transform performed on the aliased subband representation, and performing acascaded inverse lapped critically sampled transformon the sets of subband samples corresponding to the first block of samples of the audio signal and sets of subband samples corresponding to the second block of samples of the audio signal, to acquire a set of samples associated with a block of samples of the audio signal.

17. A non-transitory digital storage medium having a computer program stored thereon to perform the method for processing an audio signal to acquire a subband representation of the audio signal, the method comprising:

performing a cascaded lapped critically sampled transform on at least two partially overlapping blocks of samples of the audio signal, to acquire sets of subband samples on the basis of a first block of samples of the audio signal, and to acquire sets of subband samples on the basis of a second block of samples of the audio signal;

identifying, in case that sets of subband samples that are based on the first block of samples represent different regions in a time-frequency plane compared to sets of subband samples that are based on the second block of samples, one or more first identified sets of subband samples out of the sets of subband samples that are based on the first block of samples and one or more second identified sets of subband samples out of the sets of subband samples that are based on the second block of samples that in combination represent the same region of the time-frequency plane, performing time-frequency transforms on the identified one or more first sets of subband samples out of the sets of subband samples that are based on the first block of samples and/or the identified one or more second sets of subband samples out of the sets of subband samples that are based on the second block of samples, to acquire one or more time-frequency transformed subband samples, each of which represents the same region in the time-frequency plane as a corresponding one of the one or more first or second identified sets of subband samples or one or more time-frequency transformed versions of the one or more first or second identified sets of subband samples; and performing a weighted combination of two corresponding sets of subband samples or time-frequency transformed versions of two corresponding sets of subband samples, one acquired on the basis of the first block of samples of the audio signal and one acquired on the basis of the secondblock of samples of the audio signal, to acquire aliasing reduced subband representations of the audio signal, when said computer program is run by a computer.

18. A non-transitory digital storage medium having a computer program stored thereon to perform the method for processing a subband representation of an audio signal to acquire the audio signal, the subband representation of the audio signal comprising sets of aliasing reduced subband samples, the method comprising:

performing a second time-frequency transform on one or more sets of aliasing reduced subband samples out of sets of aliasing reduced subband samples corresponding to a first block of samples of the audio signal and/or one or more sets of aliasing reduced subband samples out of sets of aliasing reduced subband samples corresponding to a second block of samples of the audio signal, to acquire one or more time-frequency transformed aliasing reduced subband samples, each of which represents the same region in the time-frequency plane as a corresponding one of the one or more sets of aliasing reduced subband samples or one or more time-frequency transformed versions of the one or more sets of aliasing reducing subband samples, performing weighted combinations of corresponding sets of aliasing reduced subband samples or time-frequency transformed versions thereof, to acquire an aliased subband representation, performing a first time-frequency transform on the aliased subband representation, to acquire sets of subband samples corresponding to the first block of samples of the audio signal and sets of subband samples corresponding to the second block of samples of the audio signal, wherein the first time-frequency transform performed on the one or more sets of aliasing reduced subband samples out of sets of aliasing reduced subband samples corresponding to the first block of samples of the audio signal or the one or more sets of aliasing reduced subband samples out of sets of aliasing reduced subband samples corresponding to the second block of samples of the audio signal is inverse to the second subband time-frequency transforms performed on the aliased subband representation, and performing a cascaded inverse lapped critically sampled transform on the sets of samples corresponding to the first block of samples of the audio signal and sets of subband sample corresponding to the second block of samples of the audio signal, to acquire a set of samples associated with the first block of samples of the audio signal or the second block of samples of the audio signal, when said computer program is run by a computer.

* * * * *